(12) United States Patent
Sternklar

(10) Patent No.: US 12,345,596 B2
(45) Date of Patent: Jul. 1, 2025

(54) METHOD AND SYSTEM FOR EXTRACTING INFORMATION FROM AN OPTICAL SIGNAL

(71) Applicant: Ariel Scientific Innovations Ltd., Ariel (IL)

(72) Inventor: Shmuel Sternklar, Yakir (IL)

(73) Assignee: Ariel Scientific Innovations Ltd., Ariel (IL)

(*) Notice: Subject to any disclaimer, the term of this patent is extended or adjusted under 35 U.S.C. 154(b) by 202 days.

(21) Appl. No.: 17/787,379

(22) PCT Filed: Dec. 20, 2020

(86) PCT No.: PCT/IL2020/051311
§ 371 (c)(1),
(2) Date: Jun. 20, 2022

(87) PCT Pub. No.: WO2021/124340
PCT Pub. Date: Jun. 24, 2021

(65) Prior Publication Data
US 2022/0381644 A1    Dec. 1, 2022

Related U.S. Application Data

(60) Provisional application No. 62/950,976, filed on Dec. 20, 2019.

(51) Int. Cl.
G01M 11/00    (2006.01)
(52) U.S. Cl.
CPC .... *G01M 11/3172* (2013.01); *G01M 11/3145* (2013.01); *G01M 11/333* (2013.01)

(58) Field of Classification Search
CPC ..... G01L 1/24; G01M 11/3145; G01M 11/00; G01M 11/333; G01M 11/3172; G01D 5/35316
See application file for complete search history.

(56) References Cited

U.S. PATENT DOCUMENTS 4,448,529 A * 5/1984 Krause ................ G01J 3/2846
250/281
4,957,365 A    9/1990 Brinkmeyer
(Continued)

FOREIGN PATENT DOCUMENTS

CN    103344194    10/2013
CN    104359491    2/2015
(Continued)

OTHER PUBLICATIONS

Notification of Office Action and Search Report Dated Aug. 18, 2022 From the State Intellectual Property Office of the People's Republic of China Re. Application No. 201980046270.7 (10 Pages).
(Continued)

*Primary Examiner* — Sang H Nguyen

(57) ABSTRACT

A system for providing information based on a spectral content of an optical signal, comprises: an optical modulator for applying a time-dependent modulation to the optical signal according to at least one sub-optical modulation frequency, to provide a modulated optical signal. The system also comprises an optoelectronic device configured for receiving the modulated optical signal and responsively generate an electrical sensing signal, and a signal processing system configured for processing the electrical sensing signal and to generate output correlative to at least one wavelength of the optical signal based on the modulation.

23 Claims, 11 Drawing Sheets

(56) References Cited

U.S. PATENT DOCUMENTS

| | | | | |
|---|---|---|---|---|
| 5,361,130 | A | * | 11/1994 | Kersey .............. G01D 5/35303 250/227.27 |
| 5,412,469 | A | | 5/1995 | Spillman, Jr. |
| 5,426,297 | A | | 6/1995 | Dunphy et al. |
| 5,675,674 | A | | 10/1997 | Weis |
| 5,680,489 | A | | 10/1997 | Kersey |
| 5,748,312 | A | | 5/1998 | Kersey et al. |
| 6,137,565 | A | | 10/2000 | Ecke et al. |
| 6,285,806 | B1 | | 9/2001 | Kersey et al. |
| 6,487,352 | B1 | * | 11/2002 | Sobiski ............. H04B 10/2569 398/147 |
| 9,025,157 | B2 | | 5/2015 | Wen et al. |
| 9,714,863 | B2 | | 7/2017 | Gotsmann et al. |
| 2002/0025097 | A1 | * | 2/2002 | Cooper .............. G02B 6/29319 385/12 |
| 2002/0041722 | A1 | | 4/2002 | Johnson |
| 2002/0063866 | A1 | | 5/2002 | Kersey et al. |
| 2004/0202400 | A1 | | 10/2004 | Kochergin |
| 2008/0204747 | A1 | | 8/2008 | Emmerson et al. |
| 2009/0231681 | A1 | * | 9/2009 | Du ....................... G02B 27/286 359/334 |
| 2010/0272391 | A1 | | 10/2010 | Onaka et al. |
| 2011/0188850 | A1 | * | 8/2011 | Mikami ..................... G02F 2/00 359/290 |
| 2012/0050735 | A1 | | 3/2012 | Higgins |
| 2013/0193961 | A1 | | 8/2013 | Wen et al. |
| 2015/0116723 | A1 | * | 4/2015 | Lefevre ................ G01C 19/726 356/464 |
| 2015/0308891 | A1 | | 10/2015 | Gotsman et al. |
| 2015/0312554 | A1 | * | 10/2015 | Banks ..................... G01S 7/499 348/50 |
| 2016/0036548 | A1 | * | 2/2016 | Song ....................... H04J 14/02 398/82 |
| 2017/0115138 | A1 | * | 4/2017 | Sternklar ................. G01D 5/36 |
| 2017/0131081 | A1 | | 5/2017 | Lau et al. |
| 2018/0003551 | A1 | | 1/2018 | Huignard et al. |
| 2018/0278456 | A1 | * | 9/2018 | Sternklar ............. H04L 27/361 |
| 2019/0154468 | A1 | * | 5/2019 | Jansen ................ H04B 10/071 |
| 2021/0262835 | A1 | | 8/2021 | Sternklar et al. |

FOREIGN PATENT DOCUMENTS

| | | |
|---|---|---|
| CN | 105333815 | 2/2016 |
| CN | 106100748 | 11/2016 |
| CN | 107947867 | 4/2018 |
| JP | H01-207642 | 8/1989 |
| JP | H05-343661 | 12/1993 |
| JP | H08-503301 | 4/1996 |
| JP | 2005-10114 | 8/2006 |
| JP | 2008-020342 | 1/2008 |
| JP | 2009-302319 | 12/2009 |
| JP | 2010-122087 | 6/2010 |
| JP | 2015-198085 | 11/2015 |
| KR | 2000-0022321 | 4/2000 |
| KR | 10-0496554 | 11/2005 |
| WO | WO 94/11716 | 5/1994 |
| WO | WO 2006/113507 | 10/2006 |
| WO | WO 2012/033718 | 3/2012 |
| WO | WO 2019/169507 | 9/2019 |
| WO | WO 2020/008464 | 1/2020 |
| WO | WO 2021/124340 | 6/2021 |

OTHER PUBLICATIONS

English Translation Dated Jan. 3, 2021 of Notification of Office Action and Search Report Dated Dec. 17, 2021 From the State Intellectual Property Office of the People's Republic of China Re. Application No. 201980046270.7. (4 Pages).

International Preliminary Report on Patentability Dated Jan. 14, 2021 From the International Bureau of WIPO Re. Application No. PCT/IL2019/050742. (10 Pages).

International Preliminary Report on Patentability Dated Jan. 14, 2021 From the International Bureau of WIPO Re. Application No. PCT/IL2020/051311. (9 Pages).

International Search Report and the Written Opinion Dated Oct. 3, 2019 From the International Searching Authority Re. Application No. PCT/IL2019/050742. (18 Pages).

International Scarch Report and the Written Opinion Dated May 31, 2021 From the International Searching Authority Re. Application No. PCT/IL2020/051311. (14 Pages).

Invitation to Pay Additional Fees and Communication Relating to the Result of the Partial International Search Dated Apr. 11, 2021 From the International Searhcing Authority Re. Application No. PCT/IL2020/051311. (5 Pages).

Notification of Office Action and Search Report Dated Dec. 17, 2021 From the State Intellectual Property Office of the People's Republic of China Re. Application No. 201980046270.7. (12 Pages).

Office Action Dated Feb. 28, 2022 From the Israel Patent Office Re. Application No. 279954. (3 Pages).

Supplementary European Search Report and the European Search Opinion Dated Feb. 22, 2022 From the European Patent Office Re. Application No. 19830499.0. (10 Pages).

Balbi et al. "Analysis of Temperature Dependence of Ge—On—Si P—I—N Phtodetectors", Physica E: Low-Dimensional Systems and Nanostructures, 41(6): 1086-1089, May 1, 2009.

Clement Bellido et al. "Spectral Analysis Using A Dispersive Microwave Photonics Link Based on A Broadband Chirped Fiber Bragg Grating", Journal of Lightwave Technology, 33(20): 4207-4214, Published Online Aug. 10, 2015.

Dash et al. "Intrinsic Optical Absorption in Single-Crystal Germanium and Silicon at 77° K and 300° K", Physical Review, 99(4): 1151-1155, Aug. 15, 1955.

Dennis et al. "Achieving High Absolute Accuracy for Group-Delay Measurements Using the Modulation Phase-Shift Technique", 23(10): 3748-3754, Nov. 2005.

Diminstein et al. Dispersion-Based Differential Wavelength Measurements for Bragg Grating Sensors, Electronics Letters,37(1):12-14, Jan. 4, 2001.

First Sensor "First Sensor WS PD Data Sheet", First Sensor, Part Description WS7.56 TO, Order # 3001222, p. 1-3, Revised Feb. 14, 2018.

Glasser et al. "Phaseless Incoherent Optical Frequency Domain Spectroscopy", Optics Letters, 42(9): 1848-1851, Published Online Apr. 11, 2017.

Goushcha et al. "On Response Time of Semiconductor Photodiodes", Optical Engineering, 59(9): 097101-1-097101-8, Published Online Sep. 8, 2017.

Harris "Optical Properties of Si, Ge, GaAs, GaSb, InAs, and InP at Elevated Temperatures", Department of the Air Force Air University, Air Force Institute of Technology, Wright-Patterson Air Force Base, Ohio, USA, Afit Scholar, Theses and Dissertations, Thesis Presented to the Faculty, Department of Engineering Physics, Graduate School of Engineering and Managment, Air Force Institute of Technology in Partial Fulfillment of the Requirements for the Degree of Master of Science in Engineering Physics, p. 1-64, Oct. 3, 2010.

Hervas et al. "An Interrogation Technique of FBG Cascade Sensors Using Wavelength to Radio-Frequency Delay Mapping", Journal of Lightwave Technology, 33(11): 2222-2226, Published Online Mar. 5, 2015.

Jang et al. "Wavelength Dependent Characteristics of High-Speed Metamorphic Photodiodes", IEEE Photonics Technology Letters, 15(2): 281-283, Feb. 2003.

Li et al. "Microwave Photonic Signal Processing and Sensing Based on Optical Filtering", Applied Sciences, 9(1): 163-1-163-12, Published Online Jan. 4, 2019.

Lucovsky et al. "Coherent Light Detection in Solid-State Photodiodes", Proceedings of the IEEE, 51(1): 166-172, Jan. 1963.

Lucovsky et al. "Transit-Time Considerations in P—I—N Diodes", Journal of Applied Physics, 35(3/Pt.1): 622-629, Mar. 1964.

Ma et al. "Modulators for Terahertz Communication: The Current State of the Art", Research 2019, |Art. ID 6482975: 22P., May 29, 2019.

(56) References Cited

OTHER PUBLICATIONS

Open Photonics "Wavelength Shift Detection", Open Photonics, Inc., Open Photonics Partner: PARC, A Xerox Company, 2 P., Sep. 9, 2015.
Sawyer et al. "Narrow Base Germanium Photodiodes", Proceedings of the IRE, 46(6): 1122-1130, Jun. 1958.
Yi et al. "Integrated Microwave Photonics for Wideband Signal Processing", Photonics, 4(4): 46-1-46-14, Published Online Nov. 30, 2017.
Yuksel et al. "Optical Frequency Domain Reflectometry: A Review", 2009 11th International Conference on Transparent Optical Networks, ICTON 2009, Azores, Portugal, Jun. 28-Jul. 2, 2009, p. 1-5, Jun. 28, 2009.
Translation Dated Apr. 4, 2023 of Notice of Reason(s) for Rejection Dated Mar. 20, 2023 From the Japan Patent Office Re. Application No. 2020-569076. (5 pages).
Official Action Dated Oct. 21, 2022 from the US Patent and Trademark Office Re. U.S. Appl. No. 17/256,664. (47 pages).
Communication Pursuant to Article 94(3) EPC Dated Feb. 13, 2023 From the European Patent Office Re. Application No. 19830499.0 (10 Pages).
Supplementary European Search Report and the European Search Opinion Dated Dec. 14, 2023 From the European Patent Office Re. Application No. 20901185.7. (8 Pages).
Supplementary European Search Report and the European Search Opinion Dated Aug. 7, 2024 From the European Patent Office Re. Application No. 24171394.0. (8 Pages).
Notice of Reason(s) for Rejection Dated Mar. 20, 2023 From the Japan Patent Office Re. Application No. 2020-569076. (5 pages).
Notice of Reasons for Rejection Dated Oct. 4, 2022 From the Japan Patent Office Re. Application No. 2020-569076. (5 Pages).
Notification of Office Action and Search Report Dated Aug. 18, 2022 From the State Intellectual Property Office of the People's Republic of China Re. Application No. 201980046270.7 together with its Summary in English. (14 Pages).
Notice of Reasons for Rejection Dated Sep. 3, 2024 From the Japan Patent Office Re. Application No. 2022-537205 and its Translation Into English. (10 Pages).

\* cited by examiner

METHOD AND SYSTEM FOR EXTRACTING INFORMATION FROM AN OPTICAL SIGNAL

RELATED APPLICATIONS

This application is a National Phase of PCT/IL2020/051311 having International filing date of Dec. 20, 2020, which claims the benefit of priority under 35 USC § 119 (e) of U.S. Provisional Patent Application No. 62/950,976 filed on Dec. 20, 2019. The contents of the above applications are all incorporated by reference as if fully set forth herein in their entirety.

FIELD AND BACKGROUND OF THE INVENTION

The present invention, in some embodiments thereof, relates to analysis of an optical signal and, more particularly, but not exclusively, to a method and system for extracting from an optical signal information that is correlative to an optical wavelength or a spectrum of optical wavelengths of optical signal.

Many applications require measurement of one or more optical wavelengths, wavelength shifts, or an optical spectrum over a spectral range, a technology known as "optical spectroscopy" or sometimes as "wavelength monitoring". For example, in recent years there has been an interest in developing systems for spectral sensing for health care service, industrial process monitoring and environmental monitoring. Typical measurements include proving the presence or absence of an analyte, determining the quality of an industrial process, sensing stress, vibrations or fractures in structures, or monitoring the reaction or binding dynamics of an analyte in water, blood, aerosols, air, food, and other specimens.

Optical spectroscopy is advantageous since it is sensitive, selective and can be used for continuous real-time monitoring without contaminating the sample. One class of spectrometers rely on dispersion to separate the light into its spectral components. Traditional dispersion-based spectrometers use a dispersion grating to change the momentum and angularly disperse light, and the spectral resolution scales with the optical path-length from the grating to the detectors, imposing a trade-off between device size and resolution. In recent years the development of "miniature" spectrometers has enabled a host of new applications due to their reduced cost and portability.

U.S. Pat. No. 9,714,863 discloses an optical spectrometer that contains a photodiode and a straining mechanism for imposing adjustable strain on the photodiode. Adjusting the strain allows adjustment of the band gap of the photosensitive region of the photodiode.

Also known is a photodiode-based wavelength sensor that operates on the principle of the responsivity dependence on wavelength [www(dot)first-sensor(dot)com/cms/upload/datasheets/WS7(dot)56_PCBA2_5000004(dot)pdf].

Also known is a wavelength sensor that is based on a filter placed before a split-photodiode detector [www(dot)open-photonics(dot)com/wp-content/uploads/2015/09/OPI_FeaturedTechnology_WSD_090915(dot)pdf].

SUMMARY OF THE INVENTION

According to an aspect of some embodiments of the present invention there is provided a system for providing information based on a spectral content of an optical signal. The system comprises: an optical modulator for applying a time-dependent modulation to the optical signal according to at least one sub-optical modulation frequency, to provide a modulated optical signal; a optoelectronic device configured for receiving the modulated optical signal and responsively generate an electrical sensing signal; and a signal processing system configured for processing the electrical sensing signal and to generate output correlative to at least one wavelength of the optical signal based on the modulation.

According to some embodiments of the invention wherein the optoelectronic device is unbiased.

According to some embodiments of the invention the optoelectronic device is responsive to electrical bias, wherein the system comprises an electrical drive circuit configured to apply an electrical bias signal to the optoelectronic device and to scan a DC level of the electrical bias signal.

According to some embodiments of the invention the optoelectronic device is responsive to electrical bias, wherein the system comprises an electrical drive circuit for applying to the optoelectronic device an electrical bias signal modulated according to a time-dependent modulation, and wherein the signal processing system is configured to generate output correlative to the at least one wavelength also based on the modulation of the electrical bias signal.

According to an aspect of some embodiments of the present invention there is provided a system for providing information based on a spectral content of an optical signal. the system comprises: a optoelectronic device being responsive to electrical bias and configured for receiving the optical signal and responsively generate an electrical signal; an electrical drive circuit for applying to the optoelectronic device an electrical bias signal modulated according to a time-dependent modulation; and a signal processing system configured for processing the electrical sensing signal and to generate output correlative to at least one wavelength of the optical signal based on the modulation of the electrical bias signal.

According to some embodiments of the invention the electrical bias signal is applied while maintaining a generally constant bandgap characterizing a photosensitive region of the optoelectronic device.

According to some embodiments of the invention the electrical drive circuit is configured to scan a DC level of the electrical bias signal in addition to the modulation of the electrical bias signal.

According to some embodiments of the invention the system comprises at least one additional optoelectronic device, wherein the modulated optical signal is directed also towards the at least one additional optoelectronic device, and wherein the signal processing system is configured for processing electrical sensing signal generated by the at least one additional optoelectronic device and to generate the output also based on electrical sensing signal generated by the at least one additional optoelectronic device.

According to some embodiments of the invention the signal processing system is configured for determining variations in the sub-optical modulation frequency, and to generate the output also based on the variations.

According to some embodiments of the invention the system comprises a beam splitting system for splitting the modulated optical signal into two modulated optical signals, and directing the two modulated optical signals to opposite sides of the optoelectronic device.

According to some embodiments of the invention the system comprises an additional optoelectronic device, and a beam splitting system for splitting the modulated optical signal into two modulated optical signals, and directing one of the two modulated optical signals to the optoelectronic device and another one of the two modulated optical signals to the additional optoelectronic device, so as to cancel optoelectronic chromatic dispersion among the two devices.

According to some embodiments of the invention the system comprises a reflector for reflecting the modulated optical signal to make a double pass within the optoelectronic device.

According to an aspect of some embodiments of the present invention there is provided a method of providing information based on a spectral content of an optical signal. The method comprises: applying a time-dependent modulation to the optical signal according to at least one sub-optical modulation frequency, to provide a modulated optical signal; receiving the modulated optical signal by a optoelectronic device, thereby generating an electrical sensing signal responsively to the modulated optical signal; and processing the electrical sensing signal to generate output correlative to at least one wavelength of the optical signal based on the modulation.

According to some embodiments of the invention the optoelectronic device is unbiased.

According to some embodiments of the invention the optoelectronic device is responsive to electrical bias, and wherein the method comprises applying an electrical bias signal to the optoelectronic device and to scan a DC level of the electrical bias signal.

According to some embodiments of the invention the optoelectronic device is responsive to electrical bias, wherein the method comprises applying to the optoelectronic device an electrical bias signal modulated according to a time-dependent modulation, and wherein the determining the at least one wavelength is based also on the modulation of the electrical bias signal.

According to an aspect of some embodiments of the present invention there is provided a method of providing information based on a spectral content of an optical signal. the method comprises: applying to a optoelectronic device that is responsive to electrical bias an electrical bias signal modulated according to a time-dependent modulation; during the application of the electrical bias signal, receiving the optical signal by the optoelectronic device, thereby generating an electrical sensing signal responsively to the optical signal; processing the electrical sensing signal to generate output correlative to at least one wavelength of the optical signal based on the modulation of the electrical bias signal.

According to some embodiments of the invention the optical signal is a continuous wave (CW) signal.

According to some embodiments of the invention the application of the electrical bias signal is while maintaining a generally constant bandgap characterizing a photosensitive region of the optoelectronic device.

According to some embodiments of the invention the method comprises scanning a DC level of the electrical bias signal in addition to the modulation of the electrical bias signal.

According to some embodiments of the invention the method comprises receiving the optical signal also by at least one additional optoelectronic device, processing electrical sensing signal generated by the at least one additional optoelectronic device, wherein the generating the output is also based on the electrical sensing signal generated by the at least one additional optoelectronic device.

According to some embodiments of the invention the method comprises determining variations in the sub-optical modulation frequency, wherein the generating the output is also based on the variations.

According to some embodiments of the invention the method comprises splitting the modulated optical signal into two modulated optical signals, and directing the two modulated optical signals to opposite sides of the optoelectronic device.

According to some embodiments of the invention the method comprises splitting the modulated optical signal into two modulated optical signals, and directing one of the two modulated optical signals to the optoelectronic device and another one of the two modulated optical signals to an additional optoelectronic device, so as to cancel optoelectronic chromatic dispersion among the two devices.

According to some embodiments of the invention the method comprises reflecting the modulated optical signal to make a double pass within the optoelectronic device.

According to some embodiments of the invention the modulation comprises radiofrequency modulation.

According to some embodiments of the invention the processing comprises processing a modulation amplitude.

According to some embodiments of the invention the processing comprises processing a modulation phase shift.

According to some embodiments of the invention the optical signal is a spectral component of a polychromatic beam, and is spatially separated from other spectral components of the polychromatic beam.

According to some embodiments of the invention the optical signal is polychromatic and the system or method is applied to generate output indicative of a spectrum of the optical signal.

According to some embodiments of the invention the modulation is characterized by a scanned modulation frequency.

According to some embodiments of the invention the optical signal is monochromatic and the system or method is applied to monitor an absolute value of the wavelength, and/or a spectral shift in the wavelength.

According to some embodiments of the invention the optical signal is indicative of a strain or a change in a strain of sample, and the system or method is in use for determining the strain or the change in the strain based on the at least one wavelength.

According to some embodiments of the invention the optical signal is indicative of a pressure or a change in a pressure applied to a sample, and the system or method is in use for determining the pressure or the change in the pressure based on the at least one wavelength.

According to some embodiments of the invention the optical signal is indicative of a temperature or a change in a temperature of sample, and the system or method is in use for determining the temperature or the change in the temperature based on the at least one wavelength.

According to some embodiments of the invention the optical signal is indicative of existence of at least one compound in or near a sample, and the system or method is in use for determining existence or level of the at least one compound based on the at least one wavelength.

According to some embodiments of the invention the optical signal is indicative of accelerative motion of a sample, and the system or method is in use for determining existence or level of the accelerative motion based on the at least one wavelength.

According to some embodiments of the invention the optoelectronic device is entrance-region-dominated, wherein a modulation frequency characterizing the modulation is above a value at which a response amplitude of the optoelectronic device equals $1/\sqrt{2}$ of a response amplitude which is responsive to a frequency at which said amplitude varies by no more than 10%.

According to some embodiments of the invention the method comprises transmitting a probe signal to an optoelectronic device, and receiving a response signal from the optoelectronic device, wherein the optical signal is the response signal, and wherein the output comprises at least one characteristic of the optoelectronic device.

According to some embodiments of the invention the at least one characteristic of the optoelectronic device is selected from the group consisting of electrical characteristics, optical characteristics, material characteristics, mechanical characteristics and temporal characteristics.

According to some embodiments of the invention the at least one characteristic of the optoelectronic device is selected from the group consisting of responsivity, quantum efficiency, resistance, capacitance, mobility of electrons and holes, mobility of excitons, material doping levels, structure, dimensions, width of depletion region, internal voltage levels, hole and electron diffusion coefficient, drift velocity, absorption spectrum, absorption values, dielectric coefficients, refractive indices.

According to an aspect of some embodiments of the present invention there is provided a method of receiving an optical signal modulated to carry a data stream, the optical signal being transmitted over an optical fiber inducing chromatic dispersion to the signal. The method comprises: directing the optical signal to a optoelectronic device configured for receiving the modulated optical signal and responsively generate an electrical sensing signal having a pulse width that is narrower than a pulse width of the optical signal by an amount selected to at least partially compensate the chromatic dispersion; and processing the electrical sensing signal to generate output indicative of the data stream.

According to an aspect of some embodiments of the present invention there is provided a method of receiving an optical signal modulated to carry a data stream, the optical signal being transmitted over an optical fiber inducing chromatic dispersion to the signal. The method comprises directing the optical signal to a optoelectronic device configured for receiving the modulated optical signal and responsively generate an electrical sensing signal having a pulse width that is narrower than a pulse width of the optical signal by an amount selected to at least partially compensate the chromatic dispersion; and processing the electrical sensing signal to generate output indicative of the data stream.

According to an aspect of some embodiments of the present invention there is provided a method of sensing. The method comprises applying a time-dependent modulation to two optical signals according to at least one sub-optical modulation frequency, to provide modulated optical signals; receiving the modulated optical signals by a optoelectronic device, thereby generating an electrical sensing signal responsively to the modulated optical signals, wherein there is a predetermined relative phase shift between the modulated optical signals; processing the electrical sensing signal to determine a phase shift between the optical signals; and generating output indicative of the phase shift.

According to an aspect of some embodiments of the present invention there is provided a method of sensing. The method comprises splitting an optical signal into two secondary optical signals; receiving one of the secondary optical signals by an entrance side of an optoelectronic device, and a another one of the secondary optical signals by a substrate side of the optoelectronic device; and monitoring an electrical signal generated by the optoelectronic device to identify at least one change in an environment through which the optical signal propagates.

According to an aspect of some embodiments of the present invention there is provided a method of sensing. The method comprises directing an optical signal to one of an entrance side and a substrate side of an optoelectronic device; reflecting back the signal to another one of the entrance side and the substrate side of the optoelectronic device; and monitoring an electrical signal generated by the optoelectronic device to identify at least one change in an environment through which the optical signal propagates.

According to an aspect of some embodiments of the present invention there is provided a method of sensing. The method comprises splitting an optical signal into two secondary optical signals; receiving one of the secondary optical signals by an entrance side of a first optoelectronic device, and another one of the secondary optical signals by a substrate side of a second optoelectronic device; combining electrical signals generated by the first and the second optoelectronic devices; and monitoring the combined electrical signal to identify at least one change in an environment through which the optical signal propagates.

The system or method as delineated above and optionally and preferably as further detailed below can be used for spectroscopy.

The system or method as delineated above and optionally and preferably as further detailed below can be used for sensing signals transmitted through optical fibers.

The system or method as delineated above and optionally and preferably as further detailed below can be used for radiofrequency-photonic signal processing.

According to an aspect of some embodiments of the present invention there is provided a method of fabricating an optoelectronic device. The method comprises receiving an input optical phase shift; selecting a width of a charge-carrier production region, and a absorption spectrum, so as to maximize a logarithmic derivative of a penetration parameter P for the input phase shift, the penetration parameter P a multiplication of the width and the absorption spectrum; and fabricating a p-n junction according to the width and the absorption spectrum.

According to some embodiments of the invention the input optical phase shift is positive.

According to some embodiments of the invention the input optical phase shift is negative.

According to some embodiments of the invention the input optical phase shift is less than 0.3 or less than 0.2 or less than 0.1 or less than 0.05 or less.

According to an aspect of some embodiments of the present invention there is provided a method of generating an optoelectronic feedback. The method comprises: generating an optical signal by an optical source; directing the optical signal to optoelectronic device to generate an electrical signal; feeding the electrical signal back to the optical source, to generate a resonant signal responsively to the electrical signal; and controlling optoelectronic chromatic dispersion of the optoelectronic device to select a wavelength of the resonant signals. In some embodiments of the present invention the resonant signal is electrical signal generated at the output of the optoelectronic device, and in some embodiments of the present invention the resonant signal is an optical signal generated at the output of the optical source optoelectronic device.

According to some embodiments of the invention the optical signal is polychromatic, and the optoelectronic device is selected to provide a set of electrical signals, each corresponding to a different wavelength, thereby generating a respective set of optical signals.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 10A shows normalized amplitude $|F|_{norm}$ (normalized to $|F_E|_{max}$) vs. $P_{tot}$; FIG. 10B shows $P(d\theta/dP)$ (left ordinate), and $S_{OED}=P(d\theta/dP)\alpha^{-1}(d\alpha/d\lambda)_{Ge}$ for germanium at $\lambda=1560$ nm (right ordinate), vs. $P_{tot}$. Note that the left ordinate is inverted. For the single-region devices, the absolute values for $P(d\theta/dP)$ and OED sensitivity peak at P≈3 for all materials and all wavelengths. For germanium in the c-band, the maximum $|S_{OED}|\approx 0.67$ deg/nm for the single-region devices. The dual-region devices can display higher sensitivity in higher regions of $P_{tot}$, however with a reduced signal amplitude. In addition, the dual-region device can be designed to display zero OED at specific $P_{tot,ZD}$ zero-dispersion points that depend on q. A specific example is described below: $P_{tot,ZD}=2.61$ for q=0.01, depicted with a cross.

FIG. 12A shows theoretical calculations (solid lines) and experimental results (dots) of the modulation phase-shift vs. wavelength for the three experiments. The top line and dots correspond to an InGaAs PIN detector and short fiber jumper. The middle line and dots correspond to a high dispersion DCF fiber with the same InGaAs detector. The lowest dots and line correspond to the Ge PN photodiode and short fiber jumper. FIG. 12B shows measured modulation phase-shift vs. wavelength due to OED in the Ge photodiode under various temperatures. The high OED region, which follows the absorption-edge region, shifts to higher wavelengths with increasing temperature as expected. The data points and lines (the lines are an aid to the viewer) are shifted vertically for clarity. The 3-sigma phase noise for all the phase measurements was $5 \times 10^{-3}$ deg at an operating electronic bandwidth of 500 Hz.

DESCRIPTION OF SPECIFIC EMBODIMENTS OF THE INVENTION

Figure 1:
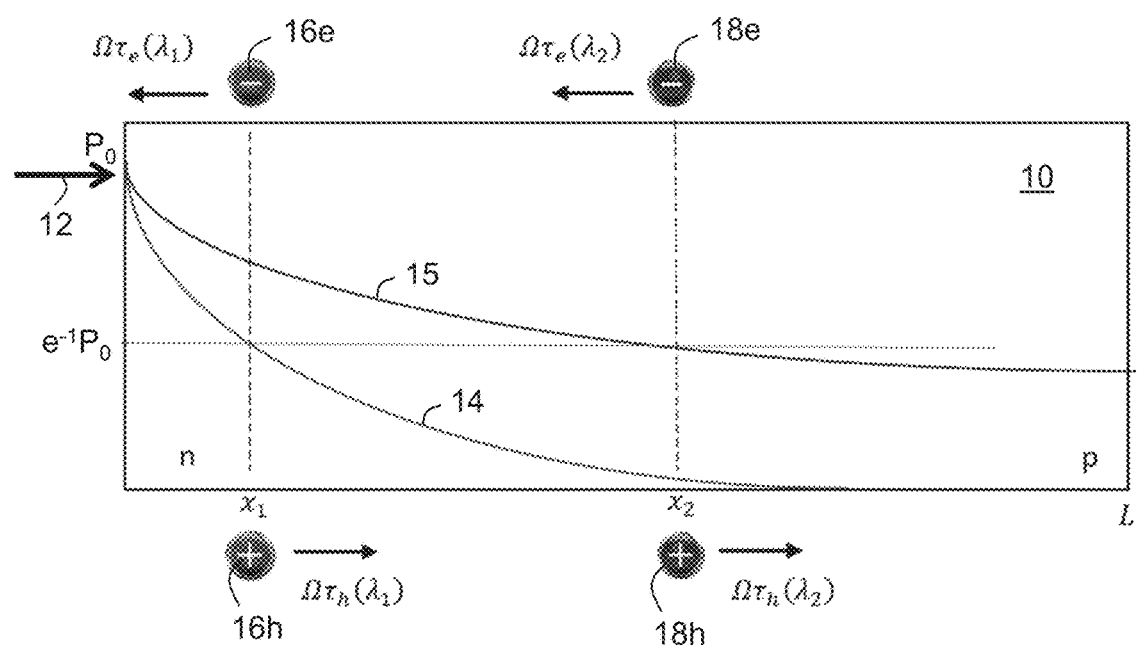
FIG. 1 is a schematic illustration of an electron-hole-pair-producing optical substance that can be used to generate an effective chromatic dispersion according to some embodiments of the present invention.

The present invention, in some embodiments thereof, relates to analysis of an optical signal and, more particularly, but not exclusively, to a method and system for extracting from an optical signal information that is correlative to an optical wavelength or a spectrum of optical wavelengths of optical signal.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The response of substances that produce current as a result of optical absorption, such as, but not limited to, semiconductor materials, is dependent upon the wavelength, due to various factors, e.g., the bandgap of the substance, the absorption spectrum of the substance, the absorption edge of the spectrum, and the quantum process of light absorption and production of mobile charge in the substance. The present Inventor discovered that the process of light absorption, charge-carrier production and the formation of current can exhibit a substantial effective chromatic dispersion (ECD). This effective chromatic dispersion will now be explained.

As used herein "charge-carrier-pair-producing optical substance" refers to a substance that is capable of absorbing light, and producing, responsively to this absorption, a pair of charge carriers (typically an electron-hole pair) at an amount which is sufficient to effect, by means of various charge-transport mechanisms such as but not limited to drift or diffusion of one or more types of charge carriers, a measurable net electrical current through the substance.

The present embodiments contemplate substances in which both types of charge carriers (e.g., both electrons and holes) are sufficiently mobile so as to jointly contribute to the net electrical current.

The present embodiments also contemplate substances in which only one type of charge carriers (e.g., only electrons) is sufficiently mobile to contribute to the net electrical current, while the mobility of the other type of charge carrier is suppressed. One particular device known in the art that is characterized by this phenomenon is known as the uni-travelling-carrier detector.

FIG. 1 schematically illustrates the general process that takes place in a charge-carrier-pair-producing optical substance 10 of length L, for the case in which the charge-carrier-pair-producing optical substance produces sufficiently mobile electrons and sufficiently mobile holes responsively to the absorption of light. A representative example for a substance that produces both mobile electrons and mobile holes, is, without limitation, a PN photodiode. While FIG. 1 describes a substance that produces both mobile electrons and mobile holes, it is to be understood that the present embodiments also contemplate substances in which only one type of charge carriers contributes to the current, as further detailed hereinabove.

An optical signal 12, consisting of a spectrum of wavelengths in the range $\lambda_1 \leq \lambda \leq \lambda_2$, and having an intensity $P_0$, enters substance 10, for example at its n-side (the cathode side). While propagating within the substance 10, the spectral components of the signal experience absorption. The dependence of the absorption of the smallest $\lambda_1$ and largest $\lambda_2$ wavelengths of signal 12 on the distance from the entry point of signal 12 are depicted as curves 14 and 15, respectively.

In FIG. 1, which is not to be considered as limiting, the absorption of $\lambda_1$ is stronger than the absorption of $\lambda_2$, and so the penetration depth $x_1$ of $\lambda_1$ is shorter than the penetration depth $x_2$ of $\lambda_2$, where $x_i$, i=1,2, are defined as the distances from the entry point of signal 12 at which the intensity of the respective component of signal 12 drops to $e^{-1} P_0$. Therefore, the component of the signal with wavelength hi is efficiently absorbed and excites a pair of charge carriers (electron-hole pairs 16e, 16h, in the present example) in the region $0 \leq x \leq x_1$ of charge-carrier-pair-producing optical substance 10, and the component of the signal with wavelength $\lambda_2$ is efficiently absorbed and excites a pair of charge carriers (electron-hole pairs 18e, 18h, in the present example) in the region $0 \leq x \leq x_2$ of substance 10. For clarity, FIG. 1 only shows the pairs 16 and that are produced at the penetration depths $x_1$, $x_2$, but it is to be understood that such electron-hole pairs are produced along the entire aforementioned regions. Thus, the charge-carrier production regions within substance 10 are wavelength dependent.

As a result of various charge-transport mechanisms, for example diffusion and drift, one or more types of the produced charge carriers travel through substance 10. In the present example, in which both the electrons and holes are sufficiently mobile to contribute to the electrical current, the electrons 16e, 18e and holes 16h, 18h travel towards opposite sides of substance 10, referred to herein as the n- and p-sides, respectively. The transit times of the electrons 16e, 18e, and holes 16h, 18h are denoted in FIG. 1 by $\tau_e(\lambda_1)$, $\tau_e(\lambda_2)$, $\tau_h(\lambda_1)$ and $\tau_h(\lambda_2)$, respectively. Since $x_2 > x_1$, electrons 18e propagate a longer distance than the electrons 16e, and holes 16h propagate a longer distance than the holes 18h, so that $\tau_e(\lambda_1) < \tau_e(\lambda_2)$ and $T_h(\lambda_2) < \tau_h(\lambda_1)$. Thus, the transit times of the charge carriers within substance 10 are also wavelength dependent.

The Inventor discovered that it is advantageous to apply a time-dependent modulation, so as to ensure that the electrical signal generated by the charge carrier is time-dependent. Due to the aforementioned wavelength-dependence of the charge carriers, electrical signals generated by charge carriers that are produced by different spectral components of the optical signal 10, exhibit different modulation parameters (e.g., modulation phase-shifts, modulation amplitudes, modulation frequencies). The advantage of such time-dependent modulation is that the modulation parameters can be monitored to provide information regarding the spectral content of optical signal 10. Specifically, one or more wavelengths of the optical signal can be calculated based on the monitored modulation parameter, and optionally based on one more of the characteristics of the charge-carrier-pair-producing optical substance. Representative examples of substance's characteristics based on which the wavelength(s) of the optical signal can be calculated include, without limitation, the diffusion coefficient of the charge-carrier(s) produced by the substance, the drift velocity of the charge carriers, the structure, geometry (e.g. lengths) and/or materials of the substances that comprise the optical substance, the absorption spectrum and the absolute values of the absorption coefficient.

Also contemplated, are embodiments in which one or more wavelengths of the optical signal can be calculated based on the monitored modulation parameter, without explicit knowledge of the diffusion coefficient or other characteristics of the substances. For example, the wavelengths can be obtained by feeding the measured data of the monitored modulation parameter to a machine learning procedure and receiving from the machine learning procedure output correlative to the wavelength(s). Representative examples of machine learning procedures suitable for the present embodiments, include, without limitation, clustering, association rule algorithms, feature evaluation algorithms, subset selection algorithms, support vector machines, classification rules, cost-sensitive classifiers, vote algorithms, stacking algorithms, Bayesian networks, decision trees, neural networks, instance-based algorithms, linear modeling algorithms, k-nearest neighbors (KNN) analysis, ensemble learning algorithms, probabilistic models, graphical models, logistic regression methods (including multinomial logistic regression methods), gradient ascent methods, singular value decomposition methods and principle component analysis.

Thus, the discovered effective chromatic dispersion is a process in which a modulation is applied to ensure that due to the wavelength dependence of the transit times of the charge carriers, one or more of the modulation parameters of the generated signal is also wavelength dependent.

The Inventor has therefore devised a method and a system that can be used for extracting information from optical signal 12 based on its spectral content. The extracted information can be of any type that is spectral-dependent. For example, optical signal 12 can be of unknown spectral content, and the system and method can extract and provide, based on the wavelength dependence of the modulation parameters, output indicative of its spectral content. Alternatively, optical signal 12 can be of known spectral content, and the system and method can extract and provide, based on the wavelength dependence of the modulation parameters, output that is correlative to its known spectral content.

Thus, in some exemplary embodiments of the present invention the method and a system extract and provide output indicative of one or more optical wavelengths of optical signal 12. In these exemplary embodiments, the spectral content of optical signal 12 is unknown, but the modulation parameters are known. When optical signal 12 is monochromatic, the method and a system can provide output indicative of the central optical wavelength of signal 12, optionally and preferably also including a characteristic spectral width of the central wavelength. When optical signal 12 is polychromatic, the method and a system can provide output indicative of the optical spectrum of signal 12, optionally and preferably also including locations of peaks, and optionally also their associated width, along a spectral axis.

In some exemplary embodiments of the present invention, the method and a system serve for sensing one or more non-optical, but wavelength-dependent, quantities. Thus, the system according to some embodiments of the present invention is a sensing system. In these exemplary embodiments, the spectral content of optical signal 12 is optionally known, but the modulation parameters are optionally unknown. Alternatively, the spectral content of optical signal 12 can be unknown, but the modulation parameters can be known. Representative examples of such wavelength-dependent quantities that can be sensed by the method and system of the present embodiments include, without limitation, temperature, change in temperature, strain, change in strain, pressure, change in pressure, material structure (e.g., lattice structure, existence of layers), material content (e.g., existence of one or more compounds in a sample), one or more optical characteristics of a material, one or more electrical characteristics of a material, one or more temporal characteristics of a material, and the like.

As a representative and non-limiting example suitable for some embodiments of the present invention, consider a modulation which is periodic in time, and which is characterized by a modulation frequency f. As a modulation parameter for this case consider the phase-shift accrued by the electrical signal. The accrued phase-shift of an electrical signal that generated by the jth component of the optical signal is $\Omega \tau_i(\lambda_j)$, where $\lambda_j$ is the wavelength of the jth component of the optical signal, $\Omega = 2\pi f$ and $i \in \{e, h\}$. This phase shift can be monitored and provide information pertaining the spectral component of the light. For example, by scanning through a set of different modulation frequencies, a set of equations for a respective set of wavelengths can be obtained, which set of equations can be solved to obtained the set of wavelengths. A preferred technique for determining the wavelength using the monitored phase-shift is provided in the Examples section that follows.

Also contemplated are embodiments in which the wavelength(s) is/are calculated based on the modulation amplitude of the output modulated signal, and embodiments in which the wavelength(s) is/are calculated based on both the modulation amplitude and the modulation phase shift of the modulated signal.

Also contemplated are embodiments in which the wavelength(s) is/are calculated based on the total modulation frequency response of the optical substance, including frequencies that not within the spectrum of the applied modulation frequencies.

The modulation frequency f is optionally and preferably a sub-optical frequency.

Herein "optical frequency" means a frequency from about 1 THz to about 30 PHz, and sub-optical frequency means any frequency which is from about 0.01 kHz to about 1 THz.

In some embodiments of the present invention the modulation frequency is within a radiofrequency range, e.g., from about 1 kHz to about 40 GHz. In some embodiments of the present invention modulation frequency is within a microwave frequency range, e.g., from about GHz to about 300 GHz.

The effective chromatic dispersion discovered by the Inventor, and exploited according to preferred embodiments of the present invention for measuring the spectral content of the optical signal, is different from conventional chromatic dispersion, since the two dispersion effects are associated with different physical phenomena. While conventional chromatic dispersion is associated with the wavelength dependence of the refractive index, and does not require mobile charge carrier production, the discovered effective chromatic dispersion is based on optical absorption and production of mobile charge carriers. Specifically, unlike conventional chromatic dispersion, the discovered effective chromatic dispersion is based on the wavelength dependence of the transit times of charge carriers produced within a charge-carrier-pair-producing optical substance.

A modulation ensuring the electrical signal generated by the charge carrier is time-dependent can be applied in more than one way. In some embodiments of the present invention the optical signal 12 is modulated by a time-dependent modulation before entering the substance 10. In some embodiments of the present invention a bias voltage applied to the substance 10 is modulated by a time-dependent modulation. In some embodiments of the present invention the optical signal 12 is modulated by a time-dependent modulation before entering the substance 10, but the bias voltage applied to the substance 10 is not modulated by a time-dependent modulation. For example, the bias voltage can be zero, or a DC voltage. In some embodiments of the present invention a bias voltage applied to the substance 10 is modulated by a time-dependent modulation, but the optical signal 12 is not modulated by a time-dependent modulation before entering the substance 10. For example, the optical signal 12 can be a continuous wave (CW) signal. In some embodiments of the present invention the optical signal 12 is modulated by a time-dependent modulation before entering the substance 10, and the bias voltage applied to the substance 10 is also modulated by a time-dependent modulation, which may be the same or different than the time-dependent modulation applied to signal 12. Also contemplated are embodiments in which the optical signal 12 is modulated by a time-dependent modulation before entering the substance 10, but substance 10 is unbiased.

The present embodiments contemplate any scheme for the time-dependent modulation, including, a modulation that is periodic in time (e.g., sinusoidal modulation, square wave modulation, triangular wave modulation, sawtooth modulation, wavelet modulation, or a combination of two or more of such modulation types), and a time-dependent modulation that is not-periodic in time (e.g., non-periodic modulation functions, random modulation, stochastic modulation, etc.).

The applied modulation can include modulation of one or more of the optical intensity, the optical frequency, the optical phase, and the polarization of the optical signal 12. When the applied modulation includes modulation of the optical frequency, one or more of the optical frequencies that make up the optical spectrum are modulated in either: (i) frequency value (e.g., frequency chirp), or (ii) intensity of the frequency component. Modulation of the intensity of the frequency component differs from an intensity modulation of the total optical intensity of the signal, in that only one or more of the frequency components are modulated in their intensity, while at least one of the frequency components is not modulated in its intensity.

In addition to the aforementioned time-dependent modulation scenarios, some of the present embodiments also contemplate scanning a DC level of the bias voltage applied to the charge-carrier-pair-producing optical substance. The present inventor found that since the charge carrier transport path, for example carrier velocity and the width of the depletion region, depend on the DC level (as well as the AC modulation) of the bias voltage, such a scan may also be used for extracting information pertaining to the spectral content of the light.

In any of the embodiments described herein, the time-dependent modulation of the bias to the charge-carrier-pair-producing optical substance (when employed), is preferably applied without changing the spectrally-dependent characteristics of the charge-carrier-pair-producing optical substance 10, for at least one or at least 2 or at least 3 or at least 4 or at least 5 or at least or at least 20 or at least 40 cycles of the modulation. Some examples of the said spectrally-dependent characteristics include: the bandgap, absorption spectrum, absorption edge, absorption values, responsivity.

"Absorption edge", as used herein, refers to the spectral region where the absorption drops sharply with wavelength. Typically, such a sharp drop is observed at the low end and/or the high end of the spectral region in which the substance has substantial absorbance.

In any of the embodiments described herein, the time-dependent modulation of the optical signal (when employed), is preferably applied without changing the bandgap characterizing the charge-carrier-pair-producing optical substance 10, for at least one or at least 2 or at least 3 or at least 4 or at least 5 or at least 10 or at least 20 or at least 40 cycles of the modulation.

In any of the embodiments described herein, the time-dependent modulation of the optical signal (when employed), is optionally and preferably applied without changing the absorption spectrum characterizing the charge-carrier-pair-producing optical substance 10, for at least one or at least 2 or at least 3 or at least 4 or at least 5 or at least 10 or at least 20 or at least 40 cycles of the modulation.

In any of the embodiments described herein, the time-dependent modulation of the optical signal (when employed), is optionally and preferably applied without changing the absorption edge, characterizing the charge-carrier-pair-producing optical substance 10, for at least one or at least 2 or at least 3 or at least 4 or at least 5 or at least 10 or at least 20 or at least 40 cycles of the modulation.

In any of the embodiments described herein, the time-dependent modulation of the optical signal (when employed), is optionally and preferably applied without changing the absorption values characterizing the charge-carrier-pair-producing optical substance 10, for at least one or at least 2 or at least 3 or at least 4 or at least 5 or at least 10 or at least 20 or at least 40 cycles of the modulation.

In any of the embodiments described herein, the time-dependent modulation of the optical signal (when employed), is optionally and preferably applied without changing the responsivity characterizing the charge-carrier-pair-producing optical substance 10, for at least one or at least 2 or at least 3 or at least 4 or at least 5 or at least 10 or at least 20 or at least 40 cycles of the modulation.

As a representative and non-limiting example suitable for some embodiments of the present invention, consider a modulated optical signal of known spectral content that is received from the environment. The environment can include a region in space, or a sample or a structure under examination. As stated, the modulation parameter is wavelength dependent. This modulation parameter can be monitored for each of the known components of the signal and provide information pertaining to one or more quantities that are wavelength-dependent and that describes the environment as further detailed hereinabove.

The present embodiments contemplate tuning the bandgap of substance 10. The tuning can be a change of the spectral location of the bandgap, and/or a change in another spectral dependence of the bandgap. In these embodiments, for each change of the bandgap, a time-dependent modulation of the intensity of the optical signal and/or of the bias to the charge-carrier-pair-producing optical substance is applied. For example, the bandgap spectral region is shifted from a first region to a second region. In this case, the time-dependent modulation is applied while maintaining the bandgap at the second region. The time-dependent modulation can also be applied more than once. For example, in the above example of changing the bandgap from the first region to the second region, the time-dependent modulation can be applied before the change while maintaining the bandgap at the first region, and then applied after the change while maintaining the bandgap at the second region.

The bandgap of substance 10 can be tuned in any way known in the art, such as, but not limited to, by applying a strain on substance 10, or by changing its temperature, or by changing the value of the applied bias.

The present embodiments contemplate tuning at least one characteristic of substance 10, which characteristic can optionally and preferably be selected from the group consisting of the absorption spectrum, the absorption edge, the absorption values, and the responsivity of substance 10. In this case, the time-dependent modulation is applied while maintaining the respective characteristic at the second region.

The technique of the present embodiments can be used for providing output indicative of the spectral content of monochromatic or polychromatic light beams.

When used with a monochromatic light beam, the technique of the present embodiments optionally and preferably provides output indicative of a spectral shift in the monochromatic light beam. For example, suppose that the optical signal 12 is monochromatic with wavelength X, and suppose that the modulation (of the input light or voltage bias) is sinusoidal and is characterized by a modulation frequency f and a modulation function $\cos(\Omega t)$, where $\Omega=2\pi f$. The AC component of the electrical current generated by the charge carriers can be written as $I(\Omega,\lambda)\cos(\Omega t+\theta(\Omega,\lambda))$. Now suppose that the wavelength changes by an amount $\delta\lambda$. Then the AC component of the output signal is $[I(\Omega,\lambda)+\delta I(\Omega,\delta\lambda)]\cos(\Omega t+\theta(\Omega,\lambda)+\delta\theta(\Omega,\delta\lambda))$, where $\delta\theta(\Omega,\delta\lambda)$ is a change in the phase shift due to a change $\delta\lambda$ in the wavelength of the light and $\delta I(\Omega,\delta\lambda)$ is a change in the modulation amplitude due to a change $\delta\lambda$ in the wavelength of the light. The change SR in wavelength can be detected by monitoring the phase-shift $\theta(\Omega,\lambda)+\delta\theta(\Omega,\delta\lambda)$, and optionally and preferably also the amplitude $[I(\Omega,\lambda)+\delta I(\Omega,\lambda)]$. The inventor found that such monitoring can achieve spectral resolution of less than 1 nm, more preferably less than 1 pm, more preferably less than 1 fm.

When used with a polychromatic light beam, the technique of the present embodiments optionally and preferably provides output indicative of the spectrum of the beam. For example, suppose that the optical signal 12 has an optical spectrum $S(\lambda)$, and suppose that the modulation (of the input light or voltage bias) is sinusoidal and is characterized by a modulation frequency f and a modulation function $\cos(\Omega t)$, where $\Omega=2\pi f$. The AC component of the electrical current generated by the charge carriers can be written as $I(\Omega,S(\lambda))\cos(\Omega t+\theta((\Omega,S(\lambda))))$, where $\theta((\Omega,S(\lambda)))$ is the accrued phase shift. The modulation frequency f is scanned, and for each frequency the output amplitude $I(\Omega,S(\lambda))$ and/or phase-shift $\theta((\Omega,S(\lambda)))$ is recorded. This generates a series of equations, from which the spectral content of the beam can be determined, based on the characteristic chromatic dispersion of substance 10. For example, assuming that the optical signal 12 has a spectral bandwidth $\Delta\lambda$, and assuming it is desired to determine $S(\lambda)$ with a spectral resolution of $\Delta\lambda/m$, m or more equations are constructed by repeating the modulation for m different modulation frequencies, to determine the amplitude $S(\lambda_i)$, i=1, 2, ..., m for each of the m spectral points to be resolved within $\Delta\lambda$.

The technique of the present embodiments can also be used for improving the spectral resolution of another spectrometer. For example, the technique of the present embodiments can be applied to a spectral component of a polychromatic beam that is separated, for example, spatially, temporally, or by other technique, from other spectral components of the beam, and the technique of the present embodiments can provide output indicative of the spectrum of the separated component. As a representative example, considered a spectrometer that spatially separates an input light beam into n spectral components (e.g., using a diffraction grating), where each of these n components is characterized by a wavelength band of $\Delta\lambda$. The technique of the present embodiments can be applied to each of these components and to output a spectrum of m sub-bands each having a spectral width of about $\Delta\lambda/m$, resulting in a spectral resolution that is m times better than the spectral resolution provided by the spatial separation.

Before providing a further detailed description of a method and system for measuring an optical wavelength or a spectrum of optical wavelengths, as delineated hereinabove and in accordance with preferred embodiments of the present invention, attention will be given to the advantages and potential applications offered thereby.

A particular advantage of the technique of the present embodiments is that it can be based on inexpensive components but still provide high spectral resolution, from nanometric down to sub-nanometric resolution.

While spectrometers and wavelength sensors are widely used in various applications, they rely on conventional means. For example, angular dispersion can be exploited by spatial separation of the light's components, e.g., using a diffraction grating, or optical fibers. Another technique exploits interferometry, such as a Fabry-Perot or Michelson interferometer, to extract spectral information. Available high-performance multiple-grating macroscopic spectrometers feature a spectral resolution $R=\lambda/\Delta\lambda$ that may exceed $R=10^6$ where $\Delta\lambda$ denotes the 3-dB power bandwidth at a particular wavelength setting. However, these are bulky, expensive and may have moving mechanical parts. More compact systems, such as micro-spectrometers fabricated using silicon process compatible technologies, reach a spectral resolution that is 3 to 4 orders of magnitudes poorer than the aforementioned high-performance multiple-grating macroscopic spectrometers.

In experiments performed by the present Inventor it was found that by exploiting the discovered effective chromatic dispersion that is based on the dependence of the wavelength on the transit time of the charge carriers, the size and cost of the system can be significantly reduced, without compromising on the spectral resolution. For example, the present Inventor experimentally demonstrated that a Germanium PN photodiode, with a net optical propagation length that can be much less than 1 mm in length, can provide an effective chromatic dispersion that is equivalent to a conventional refraction-induced chromatic dispersion accumulated over a 210 km of a conventional SMF28 optical fiber.

Figure 2A:
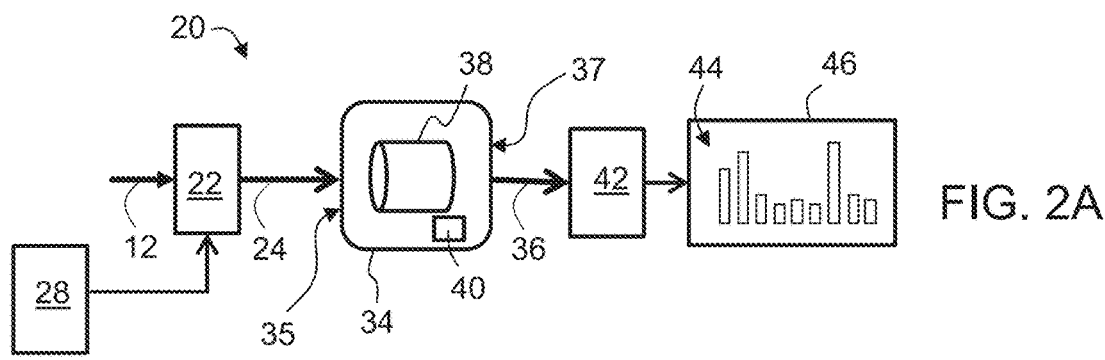
FIGS. 2A-H are schematic illustrations of a system for providing output correlative to a spectral content of an optical signal, according to some embodiments of the present invention.
Figure 2B:
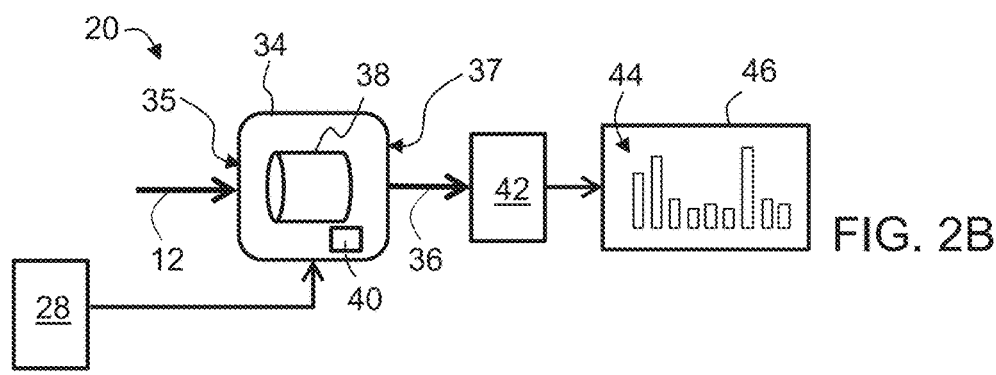

Reference is now made to FIGS. 2A and 2B, which are schematic illustrations of a system 20 for providing output correlative to a spectral content of an optical signal, according to some embodiments of the present invention. Referring to FIG. 2A, system 20 optionally and preferably comprises an optical modulator 22 configured for applying a time-dependent modulation to optical signal 12. The modulation is optionally and preferably external modulation, in which the unmodulated optical signal 12 is received from a sample or an external source (not shown) and is modulated by modulator 22 that receives a modulating signal from a controller 28. Controller 28 can include a dedicated circuit for generating the modulating signal. Also preferred, are embodiments in which the modulation is a direct modulation, in which case optical modulator 22 serves also as a light source that receives the modulating signal from a controller 28, and generates the modulated signal 24. The time-dependent modulation applied by modulator 22 is optionally and preferably characterized by at least one sub-optical modulation frequency f.

System 20 also comprises one or more optoelectronic devices 34, each being configured for receiving modulated optical signal 24, and responsively generate an electrical sensing signal 36. While FIGS. 2A and 2B illustrate only one optoelectronic device 34 for system 20, it is to be understood that in some embodiments of the present invention system 20 comprises a plurality of optoelectronic devices 34, which can be arranged in serial, or parallel, or a combination of serial and parallel optical arrangement. In parallel optical arrangement, the light is split into M parallel paths and illuminates M systems 20 simultaneously. In serial optical arrangement, the light illuminates one of systems 20 detector, some of the light exits the first system 20 and illuminate another one of systems 20 and so on.

Each of the optoelectronic device(s) 34 typically comprises a photosensitive region 38, which is preferably made, at least in part, from a charge-carrier-pair-producing optical substance, such as, but not limited to, substance 10. In some embodiments of the present invention, two or more of devices 34 have photosensitive regions characterized by different responses to the light. For example, two or more of devices 34 can have different bandgap spectral locations, or different wavelength dependence of the phase-shift as a function of the modulation frequency, or the like. When there is more than one device 34 they can be applied by the same bias voltage or voltage modulation, or two or more of devices 34 can be applied with different bias voltages or voltage modulations.

Representative examples for materials which can serve as charge-carrier-pair-producing optical substance 10 and which photosensitive region 38 may comprise, include, without limitation, semiconductors, organic materials, perovskite, polymers, plastics, dielectric materials, metallic materials, inorganic materials, p-type materials, n-type materials, intrinsic material, undoped materials, doped materials, PN junctions, PIN junctions, nanowires, plasmonic material and the like. For example, optoelectronic device 34 can comprise at least one of: a PN photodiode, a PIN photodiode, a uni-travelling carrier photodiode, a metal-semiconductor-metal detector, a Schottky photodiode, a photoconductor, photovoltaic sensor, phototransistor, photoresistor, photomultiplier, avalanche photodiode, photoelectric detector, photoemission detector, CCD detector, CMOS detector, Golay cells, bolometers, thermal light detector, single-photon detectors. In addition, each of the aforementioned detectors is based on a particular physical mechanism for light absorption-induced current production. The optoelectronic device can comprise one or more of these physical mechanisms. Optoelectronic device 34 may optionally also comprise additional components such as an internal circuit board 40, for example, for pre-amplification, signal routing, and the like, as known in the art. The optoelectronic device 34 can have a wide range of sizes. Conventional photodiodes have a light-propagating length in the optoelectronic light-absorption region in the range of 100 nm, 1 micron, 10 microns, 100 microns, 1 mm or even more, and their width or diameter are nominally in the same ranges. Other types of charge-carrier-pair-producing optoelectronic devices, such as wires, can have transverse diameters in the range of 1 nm, 10 nm, 100 nm, 1 micron, 10 microns or more, and optical propagating lengths ranging from nanometers to meters. Many other types of geometries, materials and physical mechanisms are also contemplated.

In the embodiment illustrated in FIG. 2B, optoelectronic device(s) 34 is/are responsive to electrical bias, and receives optical signal 12. In this embodiment, controller 28 serves as an electrical drive circuit for applying to one or more of optoelectronic device(s) 34 an electrical bias signal that is modulated according to a time-dependent modulation, which is optionally and preferably characterized by at least one sub-optical modulation frequency f Optionally, controller 28 scans a DC level of the applied electrical bias signal.

In some embodiments of the present invention the material which photosensitive region 38 may comprise is selected in accordance with the expected wavelength of the optical signal used by system 20. Preferably, the material is selected according to its wavelength-dependent absorption spectrum $\alpha$. As demonstrated in the Examples section that follows, the quantity $(1/\alpha)d\alpha/d\lambda$, which is the derivative of the logarithm of the absorption spectrum with respect to the wavelength, is proportional to the sensitivity of device 34 to optoelectronic chromatic dispersion, and that it exhibits a peak when plotted as a function of the wavelength, where the location of the peak is different for different materials. Thus, according to some embodiments of the present invention the material which photosensitive region 38 may comprise is selected such that the quantity $(1/\alpha)d\alpha/d\lambda$ reaches a peak within an expected wavelength range of the optical signal. Alternatively, for a given device 34 in which the photosensitive region 38 is made of a material having an absorption spectrum a, the wavelength of the optical signal directed to device 34 can be selected with a range at which the quantity $(1/\alpha)d\alpha/d\lambda$ reaches a peak.

In some embodiments of the present invention the size of photosensitive region 38 is also selected in accordance with the expected wavelength of the optical signal used by system 20. The inventors found that the sensitivity of device 34 to optoelectronic chromatic dispersion, is also proportional to the quantity $Pd\theta/dP$, which the derivative of the phase shift $\theta$ with respect to the logarithm of P, where P is a dimensionless parameter defined as the aW, where W is the width of the active charge-pair producing region of either the light entrance region, or the opposite region (also referred to as the substrate region) or a sum of both regions (see, for example, FIG. 8, where W can be either $W_E$ or $W_S$ or $W_E+W_S$).

The P parameter can be viewed as a parameter that describes the ratio between the dimension of device 34 and the penetration depth of the illuminating light, which will depend upon the wavelength of the light. In some embodiments of the present invention the width of the side of device 34 that receives the optical signal is selected to optimize the value of the P parameter. In other embodiments, the width of the substrate side is selected to optimize the P parameter. In still further embodiments, the sum of the P parameter for the two regions is optimized. In experiments performed by the Inventors it was found that for value of P which are about 3 adequate sensitivity was achieved. Thus, the width of the side of device 34 that receives the optical signal is optionally and preferably about 3 times larger (e.g., from about 2.5 times larger to about 3.5 times larger) than the light penetration depth for the light that the device is designed to receive.

Optoelectronic device(s) 34 typically has a first side 35 and a second side 37. The side through which the light enters device 34 (side 35, in FIGS. 2A and 2B) is referred to as the entrance side. The side opposite to the entrance side is referred to as the substrate side. Thus, for example, in FIG. 2A side 35 is the entrance side and side 37 is the substrate side.

The widths of the charge-pair producing regions of device 34 can be different. When the light enters device 34 such that the width of the charge-pair producing region at the entrance side is much larger (e.g., at least 4 times or 8 times or 16 times or 32 times or 64 times of 128 times larger) than the width of the charge-pair producing region at the substrate side, device 34 is referred to as "entrance-region-dominated". Conversely, when the light enters device 34 such that the width of the charge-pair producing region at the substrate side is much larger (e.g., at least 4 times or 8 times or 16 times or 32 times or 64 times of 128 times larger) than the width of the charge-pair producing region at the entrance side, device 34 is referred to as "substrate-region-dominated". When the light enters device 34 such that the width of the charge-pair producing region at the entrance side is approximately the same as the width of the charge-pair producing region at the substrate side, device 34 is referred to as a "dual-region device". It is convenient to define the parameters $q=W_E/(W_E+W_S)$ for characterizing the device in terms of the dominance of the charge-pair producing regions, when q approaches 1 (e.g., $q \geq 0.8$, or $q \geq 0.9$, or $q \geq 0.99$, or $q \geq 0.999$), the device is "entrance-region-dominated", when q approaches 0 (e.g., $q \leq 0.2$, or $q \leq 0.1$, or $q \leq 0.01$, or $q \leq 0.001$), the device is "substrate-region-dominated", and when q is sufficiently far from 0 and 1 (e.g., $0.001<q<0.999$, or $0.01<q<0.99$, or $0.1<q<0.9$, or $0.2<q<0.8$) device 34 is referred to as a "dual-region device".

When device 34 is entrance-region-dominated, the modulation frequency f can, In some embodiments of the present invention, be above a value $f_c$ at which a response amplitude of the optoelectronic device equals $1/\sqrt{2}$ of its response amplitude at a frequency region of sufficiently small frequencies, where frequency region of sufficiently small frequencies is region over which the response amplitude varies with the modulation frequency by no more than 10% or no more than 5% or no more than 1%. The inventors found that for an entrance-region-dominated device the sensitivity of device 34 to the optoelectronic chromatic dispersion increases with the frequency in the region where the frequency is above $f_c$.

In any of the above embodiments, the electrical sensing signal 36 generated by each of devices 34 is preferably transmitted to a signal processing system 42 that is configured for processing signal(s) 36 to determine a measure correlative to at least one wavelength of the optical signal based on modulation. The signal processing applied by signal processing system 42 can be in the temporal domain, the frequency domain, or in both the temporal and frequency domains, using any known type of signal processing techniques.

Signal processing system 42 optionally and preferably generates output indicative of the determined wavelength. For example, processing system 42 can generates a graphical representation 44 of the spectrum of signal 12 on a display device 46. Alternatively, or additionally, processing system 42 can generates output describing a change in one or more of the determined wavelength(s). Alternatively or additionally, processing system 42 can generates output describing one or more wavelength-dependent quantities other than the wavelength or wavelengths of signal 12, as further detailed hereinabove.

In some embodiments of the present invention signal processing 42 determines variations in the modulation frequency spectrum when comparing the input modulation spectrum to the output modulation spectrum. For example, processing 42 can determine the spectrum of the modulation. The advantage of these embodiments is that new modulation frequencies may form as a result of the optoelectronic interaction between the light and charge-carrier-pair-producing optical substance, or for example some of the applied modulation frequencies are enhanced, while others are suppressed. Monitoring variations in the modulation frequencies can increase the amount of information provided by system 20. Such information, once analyzed, can increase the accuracy of system 20. As a representative example, which is not to be considered as limiting, the frequency spectrum of the modulation can be fed to the aforementioned machine-learning procure, thereby increasing the feature space and the likelihood for a more accurate output.

In some embodiments of the present invention controller 28 controls the modulation (of signal 12 and/or bias voltage), and signal processing system 42 that processes the electrical sensing signal 36, are provided as a unified system configured both for providing the modulating signal to modulator 22 and for processing the sensing signal. These embodiments are advantageous since they allow the processing to be synchronized with the modulation. Alternatively, controller 28 and processing system 42 can communicate with each other for synchronization.

For clarity of presentation, FIG. 2A illustrates system 20 in an embodiment in which controller 28 controls only modulator 22 (so that only the optical signal is modulated), and FIG. 2B illustrates system 20 in an embodiment in which controller 28 controls only the voltage bias of device 34 (so that only the bias is modulated). However, it is to be understood that embodiments in which controller 28 is configured to control both modulator 22 and the voltage bias applied to device 34). The skilled person, provided with the detailed described herein would know how to adjust FIG. 2A and/or FIG. 2B for such embodiments.

When controller 28 is allowed to control both the modulator 22 and the bias of device 34, controller 28 can modulate by a time-dependent modulation both the optical signal 12 and the voltage bias applied to device 34. In these embodiments, the signal processing system 42 determines the measure correlative to the wavelength(s) based on both modulations. For example, the modulation frequencies can be scanned and a set of equations for a respective set of wavelengths can be obtained, where one or more of the equations of the set can be obtained based on (i) the modulation frequency of the optical signal, (ii) the modulation frequency of the bias, or (iii) the modulation frequency of the optical signal and the modulation frequency of the bias. The obtained set of equations can then be solved to obtain the set of wavelengths.

Controller 28 can, as stated, also be used to scan a DC level of the bias to device 34. When controller 28 is allowed to control both the modulator 22 and the bias of device 34, controller 28 can modulate by a time-dependent modulation the optical signal 12, and scan a DC level of the bias. The DC level of the bias can be scanned either with or without modulation of the bias, as desired.

Figure 2C:
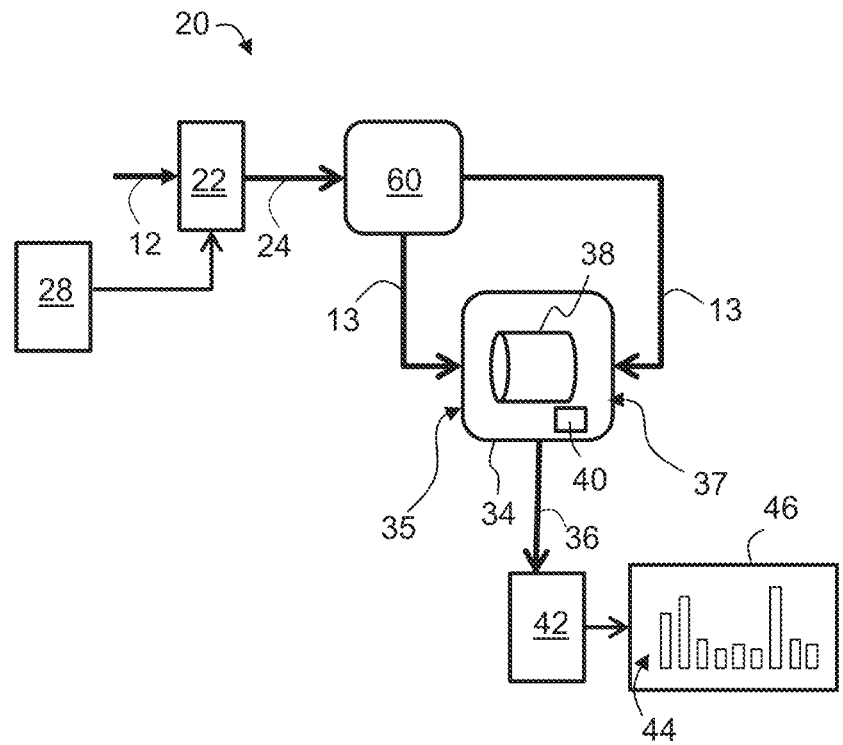
Figure 2D:
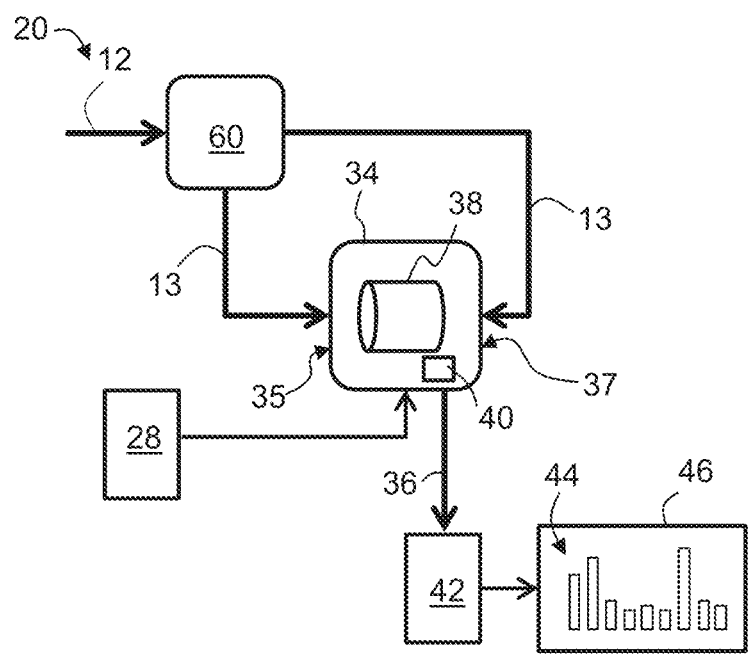

FIGS. 2C and 2D are schematic illustrations of system 20 in embodiments in which the light is split before entering device 34. In these embodiments system 20 comprises a beam splitting system 60 for splitting the signal 24 (FIG. 2C) or 12 (FIG. 2D) into two optical signals 13, and directing the two optical signals 13 to opposite sides 35 and 37 of device 34.

Figure 2E:
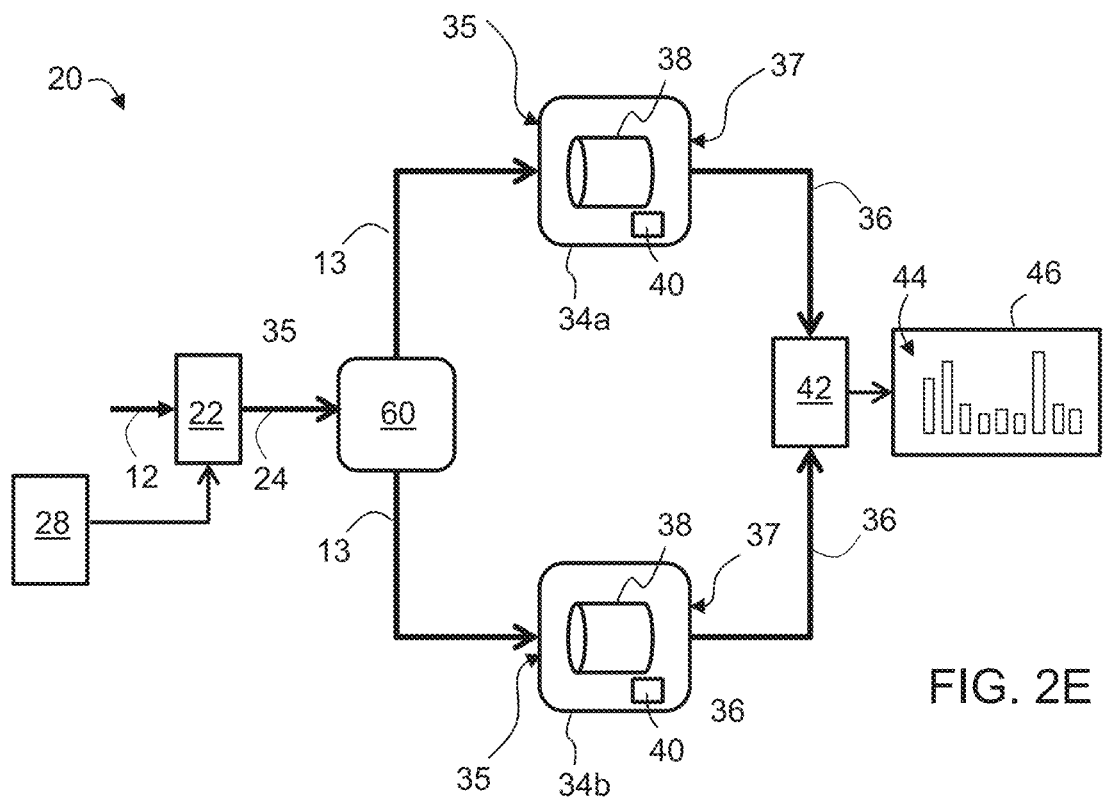
Figure 2F:
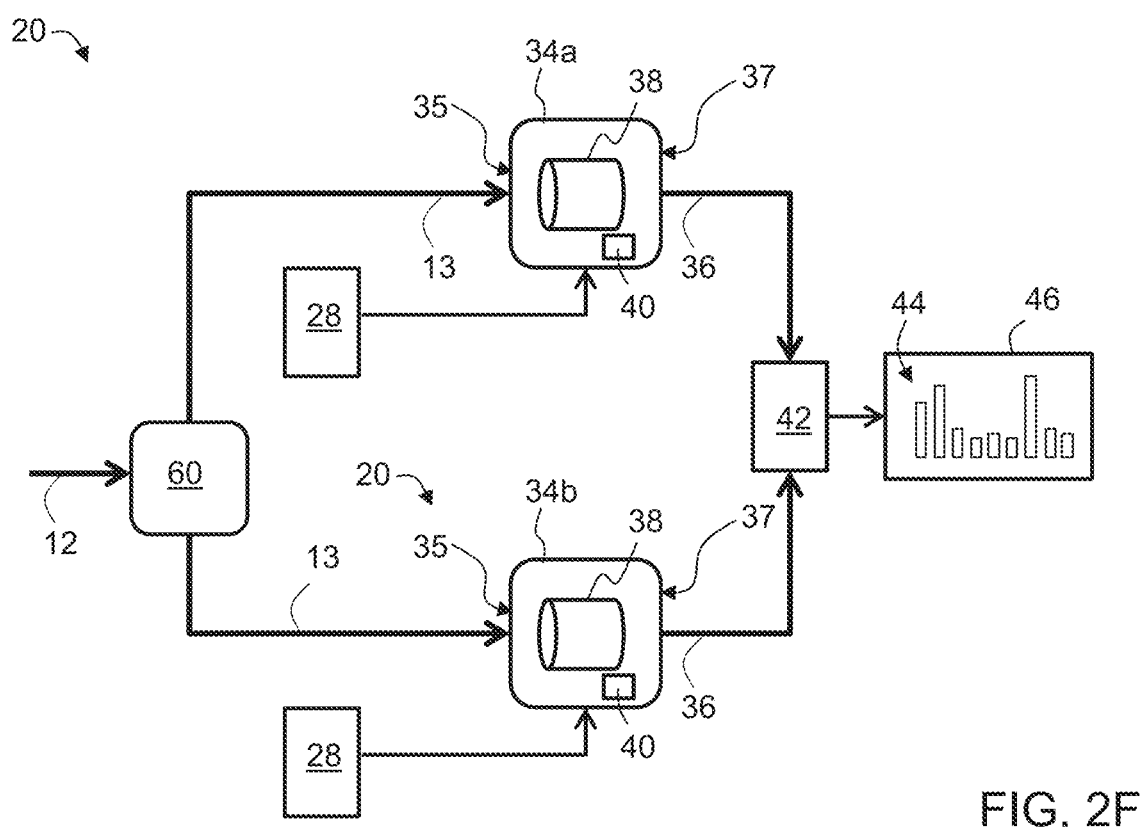

FIGS. 2E and 2F are schematic illustrations of system 20 in embodiments in which there are two devices 34a and 34b, where one of the devices is an entrance-region-dominated and the other device is a substrate-region-dominated. Beam splitting system 60 splits the signal 24 (FIG. 2E) or 12 (FIG. 2F) into two optical signals 13, and directs one of the two signals 13 to the first side 35 of device 34a and the other one of the two signals 13 to the first side 35 of device 34b. Signal processing system 42 receive the electrical signals 36 from both devices 34a and 34b, combines them, and generates output as further detailed hereinabove.

Figure 2G:
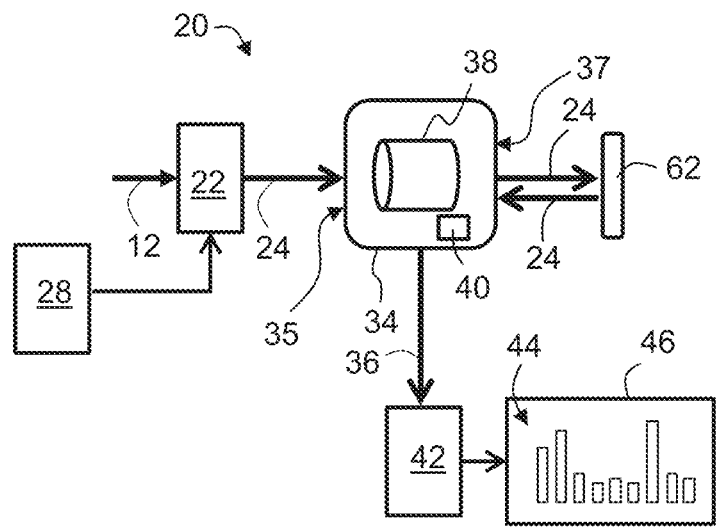
Figure 2H:
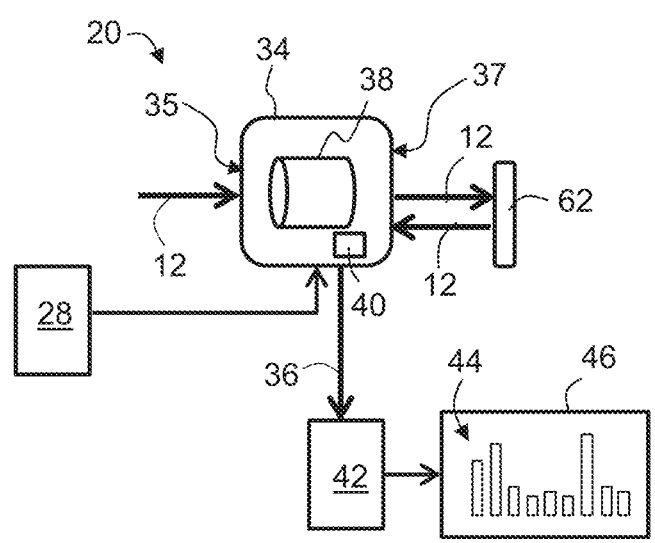

FIGS. 2G and 2H are schematic illustrations of system 20 in embodiments in which system 20 employs a reflector 62 for reflecting the optical signal 24 (FIG. 2G) or 12 (FIG. 2F) to make a double pass within device 24.

The configurations illustrated in FIGS. 2C-2H are particularly useful when it is desired to cancel optoelectronic chromatic dispersion. As demonstrated in the Examples section that follows, the Inventors discovered that the optoelectronic chromatic dispersion of device 34 can have opposite signs for entrance-region-dominated and substrate-region-dominated devices. This discovery has led Inventors to devise the configurations shown in FIGS. 2C-H since when optical signal enter the same device 34 from two opposite sides, or two devices wherein one is entrance-region-dominated and the other is substrate-region-dominated, the optoelectronic chromatic dispersion exhibited by one of the signals cancels the optoelectronic chromatic dispersion exhibited by the other signal.

Also contemplated are embodiments in which a dual-region device is fabricated, and the fabrication parameters (e.g., the widths $W_E$ and $W_S$, the coefficient $\alpha$, etc.) are selected such that for the particular wavelength of the signal 12, the optoelectronic chromatic dispersion is suppressed (e.g., between −1 and 1 or between −0.5 and 0.5 or between −0.1 and 0.1 or deg/nm, or less) or has a predetermined sensitivity value.

Cancelation or suppression of the optoelectronic chromatic dispersion can be utilized, for example, in applications in which device 34 is used as a sensor for an environmental quantity, such as, but not limited to, temperature, pressure, strain, vibration and the like. This is because the cancelation of the optoelectronic chromatic dispersion makes device 34 more sensitive to any change in the wavelength of the signal. Thus, configurations in which the optoelectronic chromatic dispersion is canceled, can be utilized in a method for sensing, whereby changes in an environmental quantity affecting the wavelength of the light result in a change in the electrical signal generated by the device. Furthermore, zero OED is useful when it is desired to detect pulsed light in a fashion that the output pulse of the detector is not broadened due to OED.

Optical signals are received by both the first side and the second side of the same or different optoelectronic devices, and the signal(s) generated by the device(s) is/are monitored to identify a change in the signal(s). Since a change in the signal correlates with a change in the wavelength of the signal, the monitoring allows identifying a change in the environment at a vicinity of the devices.

The present Inventors also contemplate embodiments at which two signals are enter from the same side of device 34. In these embodiments a predetermined relative modulation phase-shift between the two optical signals e.g., a relative modulation phase-shift of from about $0.47\pi$ to about $0.6\pi$, or from about $0.9\pi$ to about $1.17\pi$ can be selected. For example, when the relative modulation phase-shift is from about $0.9\pi$ to about $1.1\pi$ the ac component of one signal cancels the ac component of the other signal. The signals are optionally and preferably of different wavelengths but the same modulation frequency is employed for both signals. The modulation frequency can be selected such that for the particular wavelengths of the two signals, the AC electrical signal generated by device 34 is zero or approximately zero (e.g., less than 10% or less than 5% or less than 1% of the amplitude of the electrical signal that would have been generated had the two signals had the same wavelength). In experiments performed by the Inventors it was found that cancelation of the electrical signal can be achieved by selecting the wavelengths such that the respective absorption coefficients of device 34 for these wavelengths differ by a factor of about 10. For example, one particular set of input wavelengths for a Ge photodiode can be the wavelength pair 1520 nm and 1580 nm, but many other combinations of wavelengths can be employed.

The Inventors found that with such cancelation the electrical signal generated by device 34 is sensitive to the phase shift between the two signals, in a manner that small changes in the phase shift result in large changes in the electrical signal. Thus, in these embodiments, the electrical sensing signal generated by device 34 is analyzed to determine a phase shift between the optical signals, and processor 42 optionally and preferably generates output indicative of the phase shift. These embodiments are useful in any system in which it is desired to phase-shift a signal and/or to measure a phase shift of the signal. Representative examples of systems suitable for the present embodiments including, without limitation, a system for measuring an internal structure of an object, a system for measuring a distance to an object, a system for measuring a motion characteristic of an object, an interferometer system, a system for measuring flow of fluid (gas or liquid), a radiofrequency transceiver system, an optical transceiver system, a communication system, a signal generating system and the like.

As a representative example, embodiments in which the phase shift is monitored can be used in a sensing system that measures one or more characteristics of an object. In these embodiments, a modulated signal interacts with the object. Following the interaction, a change in the modulation of the signal is analyzed to extract one or more characteristics of an object, wherein the characteristics can relate to the structure of the object, the position of the object, the motion of the object or the thermal state of the object. The transmission of modulated signal to the object can comprise generating a predetermined phase shift between the transmitted modulated signal and a reference signal. The analysis can comprise detecting the phase shift between the signal received from the object and the reference signal.

Figure 3:
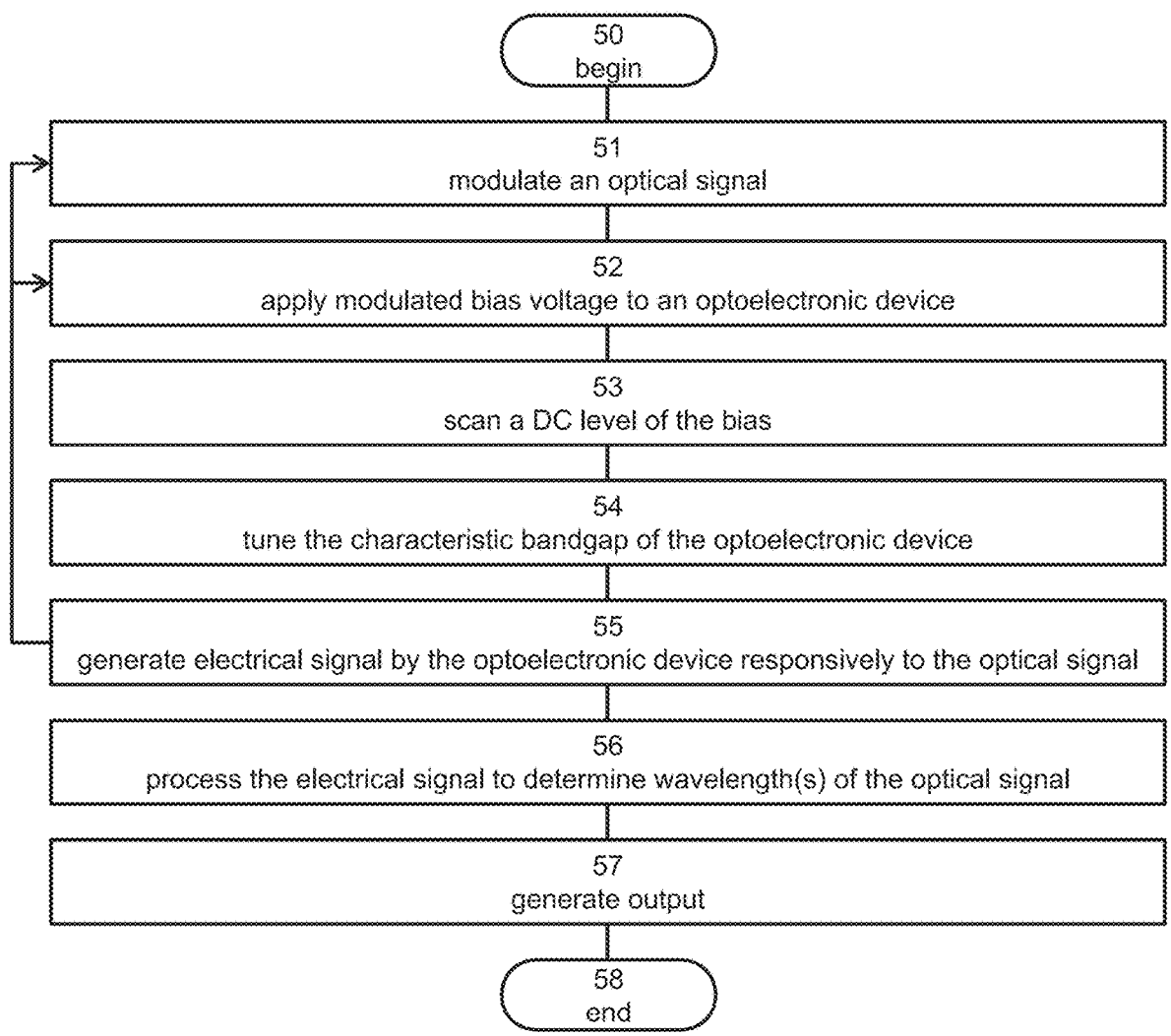
FIG. 3 is a flowchart diagram of a method suitable for measuring a spectral content of an optical signal, according to various exemplary embodiments of the present invention.

Reference is now made to FIG. 3 which is a flowchart diagram of a method suitable for measuring a spectral content of an optical signal, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 50 and optionally and preferably continues to 51 at which a time-dependent modulation is applied to the optical signal, as further detailed hereinabove. Alternatively, or, if desired, additionally, the method can continue to 52 at which a optoelectronic device, e.g., device 34 is applied with an electrical bias signal that modulated according to a time-dependent modulation, as further detailed hereinabove.

In some embodiments of the present invention the method proceeds to 53 at which a DC level of the electrical bias signal is scanned. Operation 53 can be executed in combination with any of operations 51 and 52. In some optional embodiments of the present invention the method proceeds to 54 at which the bandgap characterizing the photosensitive region of the optoelectronic device (e.g., photosensitive region 38) is tuned so as to match the expected spectrum of the optical signal. Operation 54 is preferably executed intermittently with operation 52 (when employed) and optionally also operation 51 (when employed), so that at least one or at least 2 or at least 3 or at least 4 or at least 5 or at least 10 or at least 20 or at least 40 cycles of the modulation is/are completed while maintaining a generally constant value for the bandgap, the absorption spectrum, the absorption edge, the absorption values, and/or the responsivity as further detailed hereinabove.

The method continues to 55 at which the optical signal is received by the optoelectronic device, thereby generating an electrical sensing signal responsively to the optical signal. In embodiments in which operation 51 is executed, the optoelectronic device is caused to receive the modulated optical signal. In embodiments in which operation 51 is not executed, the optoelectronic device is caused to receive the unmodulated optical signal.

The method can loop back from 55 to 51 and/or 52 so as to scan the modulation frequency, thereby providing a set of electrical sensing signals, each signal corresponding to a different modulation frequency. The method continues to 56 at which the electrical sensing signal is processed to determine a measure correlative to one or more wavelength(s) of the optical signal based on the modulation, as further detailed hereinabove. The method continues to 57 at which output correlative to the wavelength(s) is generated, and ends at 58.

The technique of the present embodiments can be used for determining strain or change in strain in a sample or a structure. A representative example for such applications includes measuring of a strain of transparent, isotropic materials that become anisotropic when squeezed, bent or stretched. For determining strain or change in strain, a light beam is caused to interact with the sample to provide an optical signal that is indicative of the strain or change in the strain of the sample, and the technique of the present embodiments of the present embodiments generates output that includes the value of the strain or change in the strain. Since the strain is typically the result of applied stress, these embodiments can also be used to determine the stress or the pressure, or changes in the stress or pressure applied to the sample.

The technique of the present embodiments can be used for measuring environmental quantities, such as, but not limited to, temperature. A representative example for such applications includes the spectroscopic measurement of a medium's temperature, by analyzing the Raman spectrum or Blackbody radiation spectrum of the medium. Another example for such applications includes measurement of infrared radiation scattered by a medium such as, but not limited to, a tissue. An additional example for such applications includes band-edge thermometry in which transmission spectroscopy, specular reflection spectroscopy, or diffuse reflectance spectroscopy is used to collect light from a sample such as, but not limited to, a semiconductor substrate, to determine the spectrum of the collected light, and to extract the temperature from the spectrum. For determining temperature is or a change in a temperature, a light beam is caused to interact with the sample to provide an optical signal that is indicative of the temperature is or change in temperature, and the technique of the present embodiments of the present embodiments generates output that includes the value of the temperature or change in temperature.

The technique of the present embodiments can be used for determining existence of at least one compound in or near a sample. A representative example for such applications includes chemical analysis by spectroscopy. In these applications, existence of compounds in a sample is determined based on the spectral lines of light transmitted through or reflected from the sample, wherein each compound has a characteristic spectral line. For determining existence of a compound in or near a sample, a light beam is caused to interact with the sample to provide an optical signal that is indicative of the existence of the compound, the technique of the present embodiments of the present embodiments determines one or more spectral lines in the optical signal, and generates output that describes existence, absence, or level of the compound(s) in the sample based on the determined spectral lines.

The technique of the present embodiments can be used for determining the molecular composition of a sample. A representative example for such applications includes vibrational spectroscopy, wherein light, typically infrared light, is used to excite molecular vibrations in a sample, hence to induce absorption at the resonance frequencies. Determination of the spectrum of the light following the excitation, allows studying the fundamental vibrations and associated rotational-vibrational structure.

For determining accelerative motion of a sample, a light beam is caused to interact with the sample to provide an optical signal that is indicative of the accelerative motion. The technique of the present embodiments of the present embodiments determines the spectrum of the optical signal, and generates output that describes the existence or level of accelerative motion based on the determined spectrum.

When the technique of the present embodiments is used for spectroscopic measurements (spectroscopic measurement of temperature, spectroscopic chemical analysis, vibrational spectroscopy, etc.) it is particularly advantageous to use a system that includes two or more optoelectronic devices 34, since such a configuration may increase the accuracy of the measurement. In these embodiments, each of devices 34 can have a different response to the light, so that the system can more accurately determine the spectral content of the light using more data.

Use of a system that includes two or more optoelectronic devices 34, is also advantageous when the technique of the present embodiments is used for sensing environmental quantities (e.g., temperature), or structural quantities (e.g., a strain of a structure). In such configurations, the optoelectronic devices 34 can be distributed in the environment or over a structure at several locations, allowing the environmental or structural quantities to be sensed simultaneously at more than one location.

The technique of the present embodiments can be used in optical communications, and in particular for at least partially compensating for chromatic dispersion of a modulated optical signal transmitted over an optical fiber.

Dispersion is a known constraint in optical communication systems, since it is a main reason for pulse spreading in optical fiber. In particular, dispersion is problematic at high bit rates (e.g., in excess of 10 Gb/s) in fiber optic systems. For example, an SMF-28 fiber has a DL=17 ps/nm per km. A 50 km SMF-28 fiber thus has a DL of about 850 ps/nm. It is desired to compensate for this dispersion by introducing a dispersion compensating device that has a DL of −850 ps/nm to negate this effect.

Conventional dispersion compensation techniques include chirped fiber Bragg gratings, and dispersion compensating fibers. In fiber Bragg grating systems, the dispersed light is directed to a fiber Bragg grating. The short wavelengths have a higher group velocity, therefore they are ahead of the other wavelengths, and longer wavelengths are trailing. The pitch and the chirp in the pitch of the Bragg grating is selected so that the shorter wavelengths are delayed with respect to the longer wavelengths by just the right amount to compensate the dispersion. Dispersion compensating fiber systems include a spool of fiber with an inverse dispersion profile to counteract dispersion over a specific length of fiber, which length is typically not longer than a few tens of kilometers.

The inventor found that the discovered effective chromatic dispersion can be used for dispersion compensation, without the need to introduce bulky and expensive components such as chirped fiber Bragg gratings, and/or dispersion compensating fibers.

Thus, in various exemplary embodiments of the invention, an optical signal that is modulated to carry a data stream exits an optical fiber and is directed to an optoelectronic device, such as, but not limited to, device 34. Device 34 receiving the modulated optical signal and responsively generate an electrical sensing signal. The effective chromatic dispersion of the optoelectronic device is preferably selected such that the pulse width of the generated electrical sensing signal is narrower than a pulse width of the optical signal exiting the optical fiber by an amount that at least partially compensates the chromatic dispersion. The electrical signal can then be processed to generate output indicative of the modulation of the optical signal and therefore of the data stream, as known in the art of optical communications.

The technique of the present embodiments can be used for investigating properties of manufactured structures and devices, particularly, but not necessarily, an optoelectronic device. In these embodiments a probe signal can be transmitted to the investigated structure or device and a response signal can be received from the investigated structure or device. This response signal can enact signal 12 and can be analyzed as further detailed hereinabove to provide output indicative of one or more characteristic of the investigated structure or device. For example, the probe signal can be transmitted to an optoelectronic device, and the response signal can be analyzed to determine one or more characteristics (e.g., electrical, optical, and/or temporal characteristics). Representative examples of characteristics that can be determined and output according to some embodiments of the present invention, include, without limitation, responsivity, quantum efficiency, resistance, capacitance, mobility of electrons and holes, doping levels, structure, dimensions, width of depletion region, internal voltage levels, hole and electron diffusion coefficient, drift velocity, absorption spectrum, absorption values, other electrical properties, other optical properties, and the like.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Improving Spectral Resolution of a Spectrometer

Figure 4:
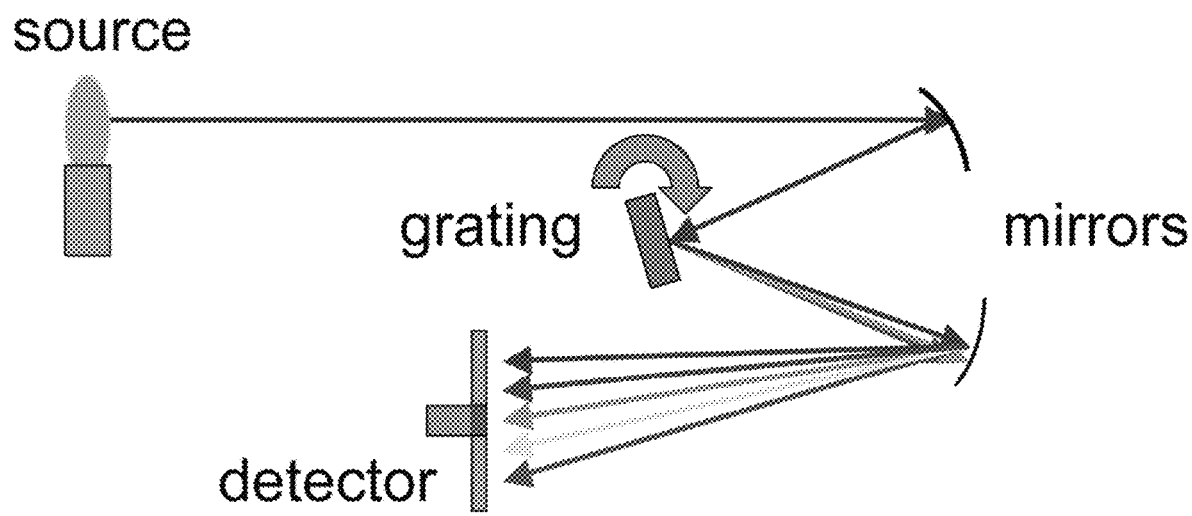
FIG. 4 is a schematic illustration of a spectrometer that employs both spatial separation with the aid of a grating, and effective chromatic dispersion, according to some embodiments of the present invention.

FIG. 4 is a schematic illustration of a spectrometer that employs both spatial separation and effective chromatic dispersion, according to some embodiments of the present invention.

A polychromatic light beam from a light source is directed, for example, by one or more mirror to a grating, which spatially separates the spectral components of the light. For example, the grating can provide n spatially separated components (five are shown in FIG. 4) each characterized by a wavelength band of $\Delta\lambda$. Each of the components is then directed into a system such as system 20, to undergo the processing as described above. Each of the systems can scan the modulation frequency through m predetermined modulation frequencies, such that output a spectrum of m sub-bands for the respective spatially resolved component. For example, each sub-band can have a spectral width of about $\Delta\lambda/m$, resulting in a spectral resolution that is m times better than the spectral resolution provided by the grating. As a representative example, suppose that the grating is a grating of an HDX Spectrometer marketed by Ocean Optics. Such a spectrometer has a typical spectral resolution of 0.5-1 nm. Suppose further that that each of the systems of the present embodiments scans the modulation frequency through 10 predetermined modulation frequencies. In this case the overall resolution of the system is from about 0.05 nm to about 0.1 nm.

Example 2

Experiments

Experiments were conducted to investigate the ability of the system to determine a spectrum of a light beam. The experiments were designed to investigate the theoretical considerations described in Example 3, below, particularly EQ. 15c therein.

The experimental set-up was similar to FIG. 2A. Light from a tunable laser in the c-band (1535-1560 nm) was sinusoidal modulated at 0.4 MHz and split into two parallel channels (only one channel is illustrated in FIG. 2A). One of the channels which was directed to a Ge PN-type photodiode (GPD Optoelectronics model GM3), and the other channel was directed to an InGaAs photodiode (Photop, model KPPD-M-2-250S-N). The detectors' outputs were monitored, and their RF phase-shift were recorded while scanning the laser wavelength. The results for the InGaAs and Ge detectors are plotted in FIG. 5 (top and bottom lines respectively) together with the theoretical predictions formulated in Example 3, below. As shown, a very good agreement was obtained between the results and the theory.

For the Ge detector, in the wavelength region around 1548 nm, the ECD effect resulted in a slope $$\frac{d\Phi}{d\lambda} = 0.53 \ deg/nm = 9 \times 10^{-3} rad/nm.$$

For comparison, a conventional standard SMF28 optical fiber is considered. The chromatic dispersion in a fiber of length L is the source of pulse spreading $\Delta\tau$, and can be approximately expressed as $\Delta\tau = DL\Delta\lambda$, where D is the dispersion coefficient and $\Delta\lambda$ is the spectral bandwidth of the light. DL can be measured by RF phase-shift method, whereby light at modulation frequency f propagates through the fiber, and the RF phase-shift dependence on wavelength $d\Phi/d\lambda$ is recorded. Since $d\Phi/d\lambda=2\pi fDL$, the chromatic dispersion DL is $(d\Phi/d\lambda)/2\pi f$. For a 1 km of SMF-28, the value of DL is about 17 ps/nm. The experimentally obtained value of $9\times10^3$ rad/nm for the Ge detector in the wavelength region around 1548 nm, corresponds to an effective DL of $-3570$ ps/nm. This is comparable in magnitude to an SMF28 fiber having a length of 210 km. As a basis of comparison, highly-dispersive dispersion compensation fibers (DCF) used in communications typically have a DL value comparable to 40-80 km of fiber.

Turning to the InGaAs detector, it is noted that in this same region, the InGaAs ECD is much smaller, with a measured slope of $2.4\times10^{-4}$ rad/nm, corresponding to an effective DL value of $-95$ ps/nm. This can be understood by recalling FIG. 1. As expanded in Example 3, below, photodiode ECD is due to the absorption dependence and penetration depth on wavelength $d\alpha/d\lambda$. In the c-band, this slope is significantly smaller for InGaAs as compared to Ge. However, it is still sizable and wideband.

Figure 5:
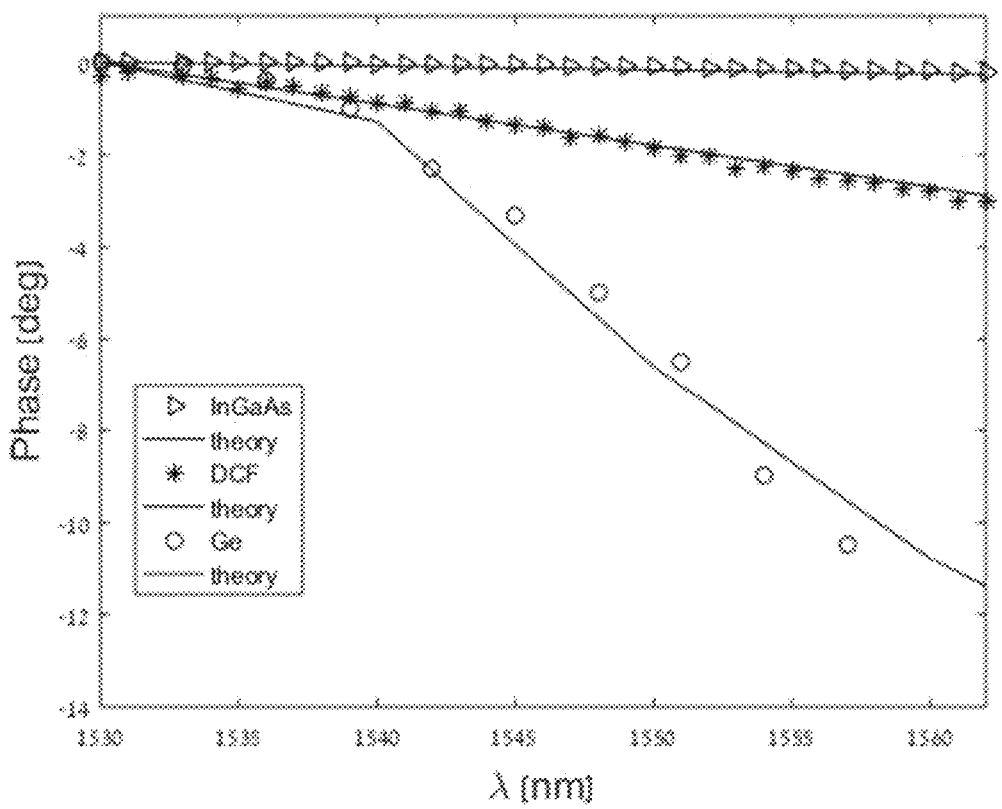
FIG. 5 shows a comparison between experimental results and theoretical prediction, obtained in experiments performed according to some embodiments of the present invention.

In an additional experiment, the same phase-shift technique was used to actually measure the $d\Phi/d\lambda$ for a commercial DCF module (type EWBDK:680) having a manufacturer stipulated value of DL=$-680$ ps/nm. The middle line in FIG. 5 shows the theory and experiment for this DCF, with good agreement.

This Example demonstrates that the discovered ECD exists, and is substantial compared to dispersive optical fibers. This Example also demonstrates good agreement with the theory.

Example 3

Theoretical Consideration

Figure 6:
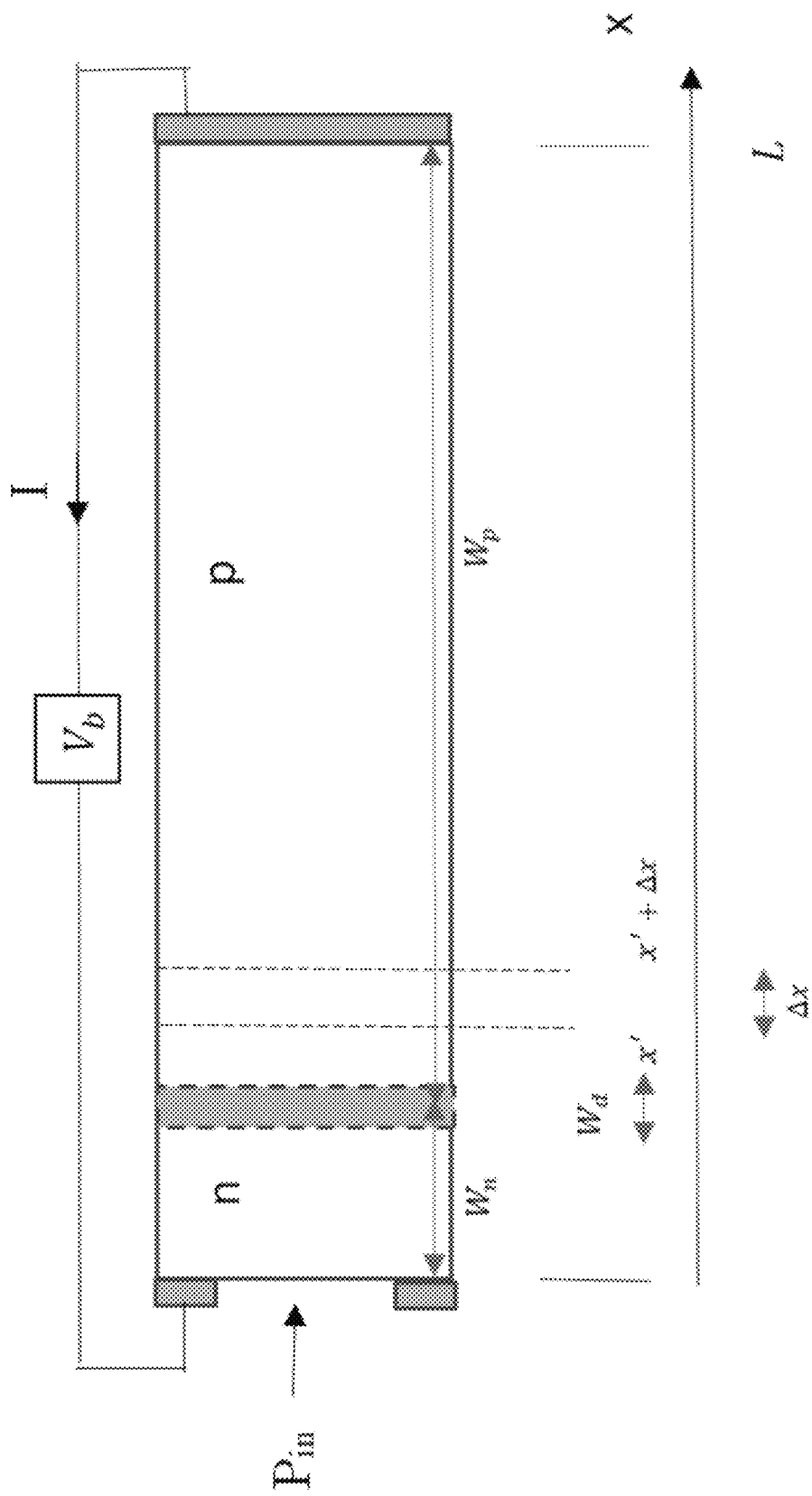
FIG. 6 is a schematic illustration describing a PN-type photodiode for which effective chromatic dispersion is calculated according to some embodiments of the present invention.

This Example relates to a PN-type photodiode schematically illustrated in FIG. 6, but can be considered representative to any charge-carrier-pair-producing optical substance. For simplicity, the following structure is considered in this Example: the non-depleted lightly-doped n-type width is denoted $W_n$, the non-depleted lightly-doped p-type width is denoted $W_p$, the width of the depletion region is denoted $W_d$, the total length is $L=W_n+W_p$ and the applied bias voltage is denoted $V_b$. To the left of the structure is a cathode (e.g. a strongly doped n region), and to the right is an anode (e.g. a strongly doped p region). By example only, the figure shows $W_n \ll W_p$, and $W_n, W_p \gg W_d$, however this is not to limit other configurations.

The Ge PN-type photodiode used in the preliminary experiments described in Section 6 (GPD Optoelectronics model GM3), where the light enters the n side. Input light power $P_{in}$ is absorbed, generating electrons and holes that move due to drift and diffusion to the n and p sides respectively. This forms an output current I, where $$I = RP_{in} \tag{1}$$

R is the responsivity of the detector in units of A/W, and can be expressed as $$R = \frac{\eta \lambda [\mu m]}{1.24} \tag{2}$$

for $\lambda$ in units of microns. $\eta$ is the quantum efficiency, and can be expressed as $$\eta(\lambda) = \frac{P_{abs}}{P_{in}} = 1 - e^{-\alpha(\lambda)L} \tag{3}$$

where $P_{abs}$ is the absorbed light power over length L (assuming that the penetration depth is larger or equal to L), and $\alpha$ is the absorption coefficient of the semiconductor material. $\alpha$, and therefore $\eta$, are dependent upon the optical wavelength. From EQs. 1-3, one has $$I = \frac{\lambda [\mu m]}{1.24} P_{abs} \tag{4}$$

which describes the total current that forms due to the total absorbed light power. For a given total input power $P_{in}$, the power decreases exponentially over x due to absorption as $$P(x) = P_{in} e^{-\alpha(\lambda)x} \tag{5}$$

Therefore, over a differential slice $\Delta x$ at location x', the absorbed power $$\Delta P_{abs}(x') \approx \frac{-dP(x)}{dx} \Delta x = \alpha P_{in} \Delta x e^{-\alpha(\lambda)x'},$$

so that the contribution to the current from this slice is $$\Delta I(x') = \frac{\lambda}{1.24} \Delta P_{abs}(x') = \frac{\alpha P_{in} \lambda}{1.24} \Delta x e^{-\alpha(\lambda)x'} \tag{6}$$

This Example considers an input power which is sinusoidally AM modulated, e.g., $P_{in} = P_0(1 + m\cos(\Omega t))$ where m is the modulation index. Inserting this into EQ. (6) one gets:

$$\Delta I(x', t) = \frac{\alpha \lambda}{1.24} \Delta x e^{-\alpha(\lambda)x'} P_0(1 + m\cos(\Omega t)) \tag{7}$$

which describes the RF modulated current contribution at x'.

In order to have an expression for the total current that is measured at the photodiode output, all of the incremental contributions to the current are summed in the range 0<x'<L.

Firstly, the total electron current contribution will be described. The total hole current contribution will be described hereinunder.

Contribution of electrons (minority charge carriers in the lightly-doped p region) to the total current, assuming zero external bias voltage:

The incremental electron current contribution at x', as described by EQ. (7), accrues an RF phase shift $\theta_e(x')$ as the electrons propagate to the left from x=x' to the depletion regime edge of the p side. They are then swept across the depletion region by a drift current mechanism. This phase shift can be expressed as $$\theta_e(x') = \Omega \tau_e \tag{8}$$

where $\tau_e$ is the electron's effective propagation time, as explained below. By example only, assuming zero external bias, it can be further assumed that there is one main contribution to the total electron current: the total diffusion current formed in the non-depleted region of length a $W_p$, which is denoted $l_e$, having diffusion time $\tau_{e,diff}$ in the region $L - W_p < x' < L$.

The expression for the total electron current contribution $l_e$, will now be developed. A sinusoidal current whose origin is at x=x' will accrue a phase shift when propagating from x=x' back to x=$W_n$ of an amount $$\theta_{e,diff}(x') = \Omega \tau_{e,diff} = \Omega \frac{(x' - W_n)^2}{D_e} \tag{9}$$

since over a given propagation distance d, the diffusion time is $$\tau_{e,diff} = \frac{d^2}{D_e}$$

where $D_e$ is the electron diffusion coefficient.

Therefore, from EQ. (7) and EQ. (9), le can be expressed as $$I_e = \frac{\alpha \lambda P_0}{1.24} \int_{W_n}^{L} e^{-\alpha(\lambda)x} \left(1 + m\cos\left(\Omega t - \Omega \frac{(x - W_n)^2}{D_e}\right)\right) dx \tag{10}$$

The AC component of this current is $$I_{e,ac} = \frac{\alpha \lambda P_0 m}{1.24} \int_{W_n}^{L} e^{-\alpha(\lambda)x} \cos\left(\Omega t - \Omega \frac{(x - W_n)^2}{D_e}\right) dx \tag{11}$$

which after integration can be expressed as $$I_{e,ac} = A \cos(\Omega t - \psi_e), \tag{12}$$

where the amplitude is $$A = \frac{\alpha \lambda P_0 m}{1.24} \sqrt{C^2 + D^2}$$

and the phase is $$\psi_e = tn^{-1}\left(\frac{D}{C}\right),$$

$$C = \int_{W_n}^{L} e^{-\alpha(\lambda)x} \cos\left(\Omega \frac{(x - W_n)^2}{D_e}\right) dx,$$

$$D = \int_{W_n}^{L} e^{-\alpha(\lambda)x} \sin\left(\Omega \frac{(x - W_n)^2}{D_e}\right) dx$$

The AC component of the total electron current thus has a RF phase-shift $\psi_e$ that depends upon the physical parameters of the photodiode and the RF modulation frequency. It also has a dependence on the optical wavelength, due to the dependence of the absorption coefficient a on the optical wavelength.

Contribution of holes (minority charge carriers in the lightly-doped n region) to the total current, assuming zero external bias voltage:

Holes are formed in the n side, and migrate to the right by diffusion to the n side of the depletion edge, and are then swept across the depletion region by a drift current mechanism. As was done for the electron current, it is assumed in this model that the majority of the hole current is diffusion current that is formed in the region $0<x'<W_n$. Therefore, following the same treatment as above, the total hole ac current can be described as $$I_{h,ac} = \frac{\alpha \lambda P_0 m}{1.24} \int_0^{W_n} e^{-\alpha(\lambda)x} \cos\left(\Omega t - y\frac{(W_n - x)^2}{D_h}\right)dx \quad (13)$$

where $D_h$ is the hole diffusion coefficient, so that after integration, $$I_{h,ac} = B \cos(\Omega t - \psi_h) \quad (14)$$

where the amplitude is $$B = \frac{\alpha \lambda P_0 m}{1.24} \sqrt{E^2 + F^2}\, a$$

and the phase is $$\psi_h = tn^{-1}\left(\frac{F}{E}\right),$$

$$E = \int_0^{W_n} e^{-\alpha(\lambda)x} \cos\left(\Omega \frac{(W_n - x)^2}{D_h}\right)dx,$$

$$F = \int_0^{W_n} e^{-\alpha(\lambda)x} \sin\left(\Omega \frac{(W_n - x)^2}{D_h}\right)dx$$

Total Amplitude and Phase-Shift of the AC Current

From the above discussion, the total AC current is $$I_{tot,ac} = I_0 \cos(\Omega t - \Phi) \quad (15a)$$

where the amplitude and phase-shift of the ac current is $$I_0 = \sqrt{(A\cos\psi_e + B\cos\psi_h)^2 + (A\sin\psi_e + B\sin\psi_h)^2} \quad (15b)$$

$$\Phi = tn^{-1}\frac{A\sin\psi_e + B\sin\psi_h}{A\cos\psi_e + B\cos\psi_h} \quad (15c)$$

Therefore, the RF output is a sinusoid signal, whose amplitude and phase-shift are wavelength-dependent through the absorption spectrum $\alpha(\lambda)$.

The above model accounted for diffusion current that forms in the non-depleted regions around the PN junction. Besides this current, there is also a drift current that was neglected, since it was assumed that the external bias is zero. However, in the presence of a non-zero reverse external bias, the depletion region increases in length, the voltage drop across the depletion region is high, and the reverse bias across it can form a significant drift current. This adds a further component to the overall phase-shift and RF amplitude that, for simplicity, was not accounted for in this model.

Example 4

Determining Fiber Bragg Grating Perturbation

The Inventor devised a method and a system that acquire interrogator data from a fiber Bragg grating(s) (FBG), directly from the modulation of light reflected off the grating(s). The inventor found that such direct acquisition benefits from many advantages. Firstly, the technique enjoys high noise rejection and high-speed measurements, since it does not requires a spectral sweep. Secondly, the technique can be executed using relatively low cost equipment compared to the equipment required for fast time-domain measurements. Thirdly, unlike conventional techniques for resolving the temporal response in the frequency domain, for which the resolution is bounded by the fading effect, the technique according to some embodiments of the present invention selects the working frequency in accordance with the periodicity in the fading effect, thereby improving the resolution.

Figure 7:
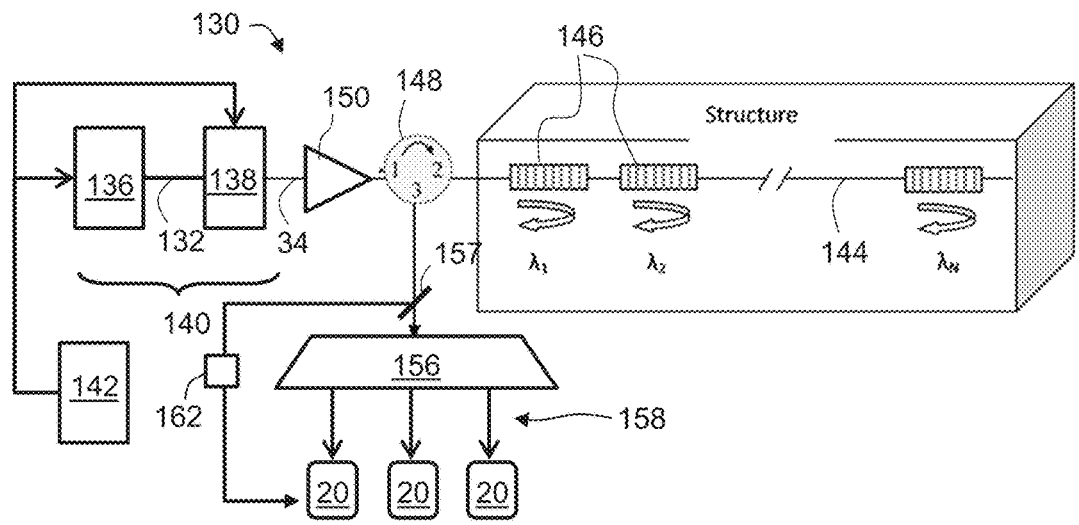
FIG. 7 is a schematic illustration of a system suitable for determining perturbation of a grating formed in an optical fiber, according to some embodiments of the present invention.

FIG. 7 is a schematic illustration of a system 130 suitable for determining perturbation of a FBG formed in an optical fiber, according to some embodiments of the present invention. In a preferred embodiment, system 130 is used for executing at least a few of the operations of the method.

A light beam is generated and is modulated to provide a modulated light beam 34. The light can be infrared light, visible light or ultraviolet light as desired. Preferably, the light is infrared light.

The generation and modulation can be executed by an optical modulation system 140. The modulation can be either a direct modulation or an external modulation, and of any type known in the art. When direct modulation is employed, a light source 136 receives a modulation signal from a controller 142 and generates modulated light beam 134. When external modulation is employed, an unmodulated light beam 132 is generated by light source 136 and is modulated by an optical modulator 138 that receives the modulation signal from controller 142. Controller can include a dedicated circuit for generating the modulation signal.

The modulation can be at any frequency range, such as, but not limited to, radiofrequency. When radiofrequency modulation is employed the modulation frequency is optionally and preferably from about 1 kHz to about 40 GHz. In various exemplary embodiments of the invention the modulation is a sinusoidal modulation, but modulation waveforms other sinusoidal are also contemplated in some embodiments. Also contemplated are embodiments in which a multi-frequency modulation is employed, for example, by a sum of sinusoidal signals, each at a different frequency. The modulation can be executed to modulate any of the amplitude, frequency and phase of the light beam, including modulations of two or more of the amplitude, frequency and phase. In a preferred embodiment, at least amplitude modulation is employed, and in a more preferred embodiment, only amplitude modulation is employed wherein the frequency and phase are not modulated.

The present embodiments also contemplate modulation scanning, wherein a frequency of the modulation is scanned over a plurality of modulation frequencies. The advantage of these embodiments is explained below. It is to be understood, however, that it is not necessary to employ modulation scanning, and that the method according to some embodiments of the present invention can be practiced also when the modulation is without frequency scanning.

In some optional embodiments of the present invention light beam 134 is amplified. This can optionally and preferably be achieved by an optical amplifier 150, such as, but not limited to, an erbium-doped fiber amplifier (EDFA), a ytterbium-doped fiber amplifier (YDFA, a Raman amplifier, a hybrid Raman/erbium-doped amplifier, a hybrid Raman/ytterbium-doped amplifier, a erbium-ytterbium co-doped fiber amplifier, a neodymium-doped fiber amplifier, a thulium-doped fiber amplifier, and the like.

The modulated light beam 134 is transmitted through an optical fiber 144 having one or more FBGs 146 formed therein. Light reflected off the FBG (s) 146 is coupled out of optical fiber 144. The FBG(s) can be fabricated within the entire or part of the core's cross-section or at the core-cladding interface of fiber 144, or in other fiber sections as known in the art. The optical fiber 144 is optionally and preferably an optical fiber with a FBG sensor or an array of FBG sensors. The FBG 146 is constituted to selectively reflect a component of the light that has wavelengths within a particular Bragg bandwidth centered at a particular Bragg wavelength, and to allow other components to continue to propagate in the fiber 144. When optical fiber 144 has a plurality of FBGs, each of at least two of the FBGs, more preferably each of the FBGs formed in fiber 144, is constituted to selectively reflect a different component of the light. Thus, each FBG 146 of fiber 144 is characterized by a Bragg wavelength (and a corresponding Bragg bandwidth), wherein at least two of the FBGs are characterized by a different Bragg wavelength. Shown in FIG. 7 is a fiber with N FBGs, characterized by a set of N different respective Bragg wavelengths, denoted $\lambda_1, \lambda_2, \ldots, \lambda_N$. The FBGs need not to be ordered according to their $\lambda$ values.

In various exemplary embodiments of the invention optical fiber 144 is deployed on or embedded within a structure such as, but not limited to, an airplane wing, a fence, a wind turbine blade, a building, a bridge, a culvert, a tunnel lining, a pipeline, a river, a flood control reservoir, a well, and the like.

The in-coupling and out-coupling of light into- and out of-fiber 144 is optionally and preferably via one or more optical couplers 148 which provide optical coupling between system 140 and fiber 144, and optionally and preferably also between fiber 144 and an optical and electrical analysis system generally shown at 152. In the schematic illustration shown in FIG. 7, which is not to be considered as limiting, optical coupler 148 is shown as an optical circulator having three of more input/output (I/O) ports (three shown in the present example), wherein at least one port is in optical communication with system 140 and at least one port is in optical communication with fiber 144. In FIG. 7, light beam 134 enters circulator 148 through its first port (1) and exits through its second port (2) into fiber 144. Light reflected off the FBG(s) 146 propagates backwards in fiber 144, enters circulator 148 through its second port (2) and exits through its third port (3). From the third port the reflect light optionally and preferably enters system 152 for performing processing and analysis as further detailed hereinbelow.

In some optional embodiments of the present invention the modulation is executed after the light exits fiber 144. In these embodiments, it is not necessary to carry out the modulation before transmitting the light to the fiber. Yet, embodiments in which the modulation is applied two or more times (e.g., before the light is coupled into the fiber, and after the light exits the fiber) are also contemplated.

In some embodiments of the present invention the reflected light beam is input to system 20. In system 20 the reflected light beam is dispersed according to the discovered effective chromatic dispersion wherein the transit times of the charge carriers depends on the wavelength. The dispersion increases the group velocity dispersion (GVD) of the reflected light beam. Preferably, following the dispersion, the magnitude of the GVD of the light beam is larger (e.g., 2 times or 4 times or 8 times or 10 times larger) than the magnitude of the combined effective GVD of all the other components in system 52.

The dispersion provided by the charge-carrier-pair-producing optical substance of system 20 is typically characterized by a dispersion coefficient DL. Suitable for the present embodiments are charge-carrier-pair-producing substances capable of effecting dispersion characterized by a positive or negative dispersion parameter having an absolute value of at least ps/nm or at least 300 ps/nm or at least 1000 ps/nm or at least 1500 ps/nm or at least 2000 ps/nm or at least 2500 ps/nm.

The signal processing system 42 of system 20 determines the phase shifts in a modulation of the reflected light off the FBG(s) 146. The present Inventors found that the modulation phase shift is indicative of a perturbation in the FBG, and can therefore improve sensing since the phase shift is determined directly from the modulation of the light, without the need to determine a time-domain response of the signal.

When fiber 144 comprises two or more FBGs 146, system 130 optionally and preferably comprises an optical de-multiplexing system 156, for de-multiplexing the reflected light beam before entering system 20. De-multiplexing system 156 can be of any type, including, without limitation, an arrayed waveguide grating, a photonic crystal fiber and the like. Shown in FIG. 7 is an optical de-multiplexing system which produces 3 channels 156, each corresponding to one of the Bragg wavelengths, but it is to be understood that de-multiplexing system 156 can produce any number of channels (including a single channel). System 130 can comprise several systems like system 20, one for each channel produced by de-multiplexing system 156 (three are shown in FIG. 7, but any number of systems 20 can be employed). In these embodiments, each channel can be input to a different system 20. Alternatively, system 20 can comprise more than one optoelectronic devices, in which case each channel can be input to a different optoelectronic device 34 of system 20.

The Inventor found that it is not necessary to de-multiplex the reflect light even when fiber 144 comprises a plurality of FBGs 146. For example, when modulation scanning is employed, the multiplicity of modulation frequencies can provide sufficient information regarding the contribution of more than one grating. In these embodiments, system 20 preferably measures, for each modulation frequency, the global phase shift and global magnitude of the reflected light. This provides a plurality of global phase shifts and a plurality of global magnitudes. Each global phase shift and global magnitude describes a wave formed of a plurality of partial waves, respectively corresponding to the plurality of FBGs in the fiber. Thus, each global phase shift and global magnitude carries information regarding the individual phase, wavelength or frequency shifts caused by the FBGs in the fiber. According to some embodiments of the present invention the number of different modulation frequencies that are employed is sufficient to extract the individual phase, wavelength or frequency shifts, and optionally also the individual magnitudes, from the global phase shifts and global magnitude. This can be done, for example, by solving a set of equations, where the unknowns are the individual phase, wavelength or frequency shifts, and the coefficients and known terms are the global phase shifts and global magnitudes. It was found by the Inventors, that for a fiber having N FBGs, it is sufficient to employ N/2 different modulation frequencies.

In some embodiments of the present invention, the processing system 42 (not shown) of system 20 also receives a signal from a reference light detector 162. Reference light detector 162 can receive a light beam that is reflected off the FBG(s) but is not subjected to further dispersion. For example, a beam splitter 157 can be placed on the optical path of the light beam exiting fiber such that one beam continues as further detailed hereinabove and another beam, serving as a reference beam, is directed to detector 162, which provides an electrical signal to the processing system 42.

Based on the phase shifts, the perturbation of the FBG is determined. For example, suppose that system 140 provides a light beam that is sinusoidally modulated according to $\cos(\Omega t)$, where $\Omega$ is the angular modulation frequency (e.g., within a radiofrequency range).

Substance 10 (not shown) of system 20 disperses the light so that each component arrives separately into the processing system 42. Suppose further that when fiber 144 is unperturbed, the light component reflected from the ith FBG exits substance 10 acquiring an overall modulation phase $\phi_i$, so that it is modulated according $\cos(\Omega t + \phi_i)$. The signal processing system 42 processes the corresponding electrical signal to determine its modulation parameters.

Suppose now that a perturbation occurs at the ith FBG so that it selectively reflects light component at wavelength $\lambda_i + \Delta\lambda_i$, where $\lambda_i$ is the wavelength (within the optical range) of the light component that would have been reflected from the ith FBG had this FBG been unperturbed. Following the dispersion by substance 10, the ith component acquires a modulation phase $\phi_i + \Delta\phi_i$ so that it is modulated according $\cos(\Omega t + \phi_i + \Delta\phi_i)$. Thus, the optical phase shift $\Delta\phi_i$ in the modulation is a proxy to the optical wavelength shift $\Delta\lambda_i$ (or, equivalently, an optical frequency shift $\Delta f_i = c\Delta\lambda_i/\lambda_i^2$, where c is the speed of light). When signal processing system 42 determined that the phase of the ith component is shifted, the method determines that perturbation occurred at the ith FBG.

Thus, the system of the present embodiments successfully determines the perturbation based on the phase shift, without relying on the optical power of the reflected light beam. This is unlike conventional techniques that require complicated optical power processing operations in order to determine the perturbation.

The perturbation as determined can be expressed in more than one way. In some embodiments, the perturbation is expressed as a shift in the respective Bragg wavelength (Ali, in the above example). The Bragg shift can be determined, for example, using an empirically generated lookup table that relates between the modulation phase shift $\Delta\phi_i$ and the Bragg shift $\Delta\lambda_i$. From the expressed value of the Bragg shift the system can determine a value of a physical quantity effecting the perturbation of the FBG, for example, as known in the art of FBG sensors.

Also contemplated are embodiments in which the perturbation is expressed as the value of the physical quantity without actually determining the Bragg shift. The value of the physical quantity can be determined using an empirically generated lookup table that relates between the modulation phase shift and the value of the physical quantity.

Representative examples of physical quantities that can be determined include, without limitation, ambient temperature, pressure applied to the fiber, strain of the fiber, accelerative motion of the fiber (e.g., vibration), changes in the environment around the FBG, such as chemical changes. Another physical quantity that is contemplated is a depth of the respective FBG that can be determined based on the pressure applied thereto.

The present Inventors found that the resolution of the sensing of the Bragg shift (hence also of the value the physical quantity to be determined) can be improved by a judicious selection of the frequency of the modulation and/or the resolution of the measurement of the modulation phase shift. Specifically, denoting the resolution of the measurement of the modulation phase shift by $\Delta\varphi_{res}$, the dispersion parameter that characterizes the dispersion by D, and the modulation angular frequency by $\Omega$, at least one of $\Omega$, $\Delta\varphi_{res}$ and D is preferably selected to satisfy the relation: $\Delta\varphi_{res}/(D \times \Omega) \leq \Delta\lambda_{res}$, where $\Delta\lambda_{res}$ is a predetermined spectral resolution threshold. For example, for a signal processing system capable of measuring the phase at a phase of resolution of $\Delta\varphi_{res}$, and substance 10 capable of effecting dispersion characterized by a dispersion coefficient D, controller 142 can be configured to generate a modulation signal characterized by an angular modulation frequency S which is at least $\Delta\varphi_{res}/(D \times \Delta\lambda_{res})$.

Typically, but not necessarily, $\Delta\lambda_{res}$ is less than 10 picometers or less than 1 picometers or less than 0.1 picometers or less than 0.05 picometers, e.g., 0.01 or less.

Example 5

Design Considerations

This Example demonstrates that a PN-type photodiode can be used as a tunable source of optoelectronic chromatic dispersion (OED), with applications in high-resolution spectroscopy, environmental sensing and RF-photonic processing, and provides design rules for fabricating a photodiode-based dispersion module that possesses large, small, zero, and either positive or negative OED. Below, the modulation-phase-shift method is used to measure the OED of a commercial germanium PN photodiode in the c-band, which displays an OED spectral sensitivity of −0.53 deg/nm, due to a large OED dispersion of −3.6×10³ ps/nm, equivalent to (but opposite in sign) approximately 210 km of SMF28 standard optical fiber. This Example also demonstrates temperature-tuning of the OED in the germanium photodiode.

Figure 8:
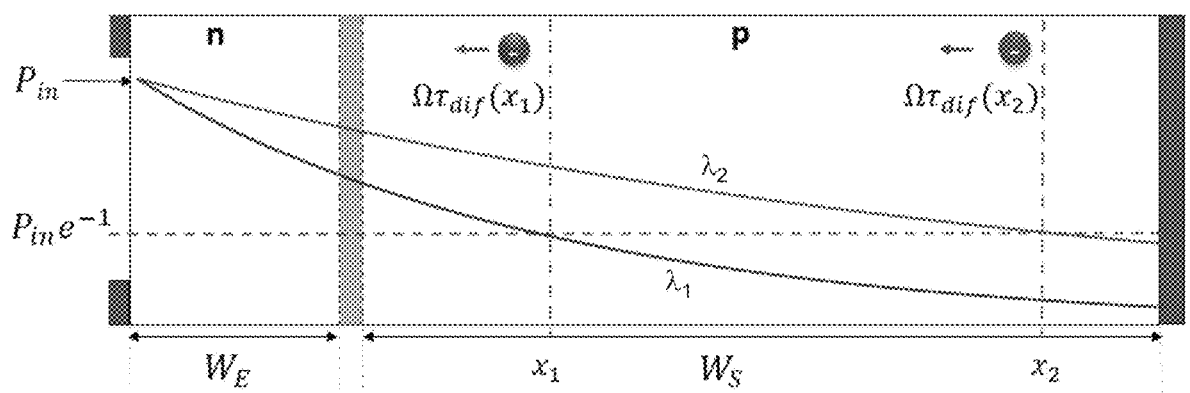
FIG. 8 is a schematic illustration of modulated light absorption, minority charge formation, and migration via diffusion current in the p-type substrate region of a PN photodiode. The absorption of short-wavelength light $\lambda_1$ and long-wavelength light $\lambda_2$ is depicted, reduced to $e^{-1}$ at the penetration depths $\lambda_1$ and $\lambda_2$ respectively. The average diffusion time $\tau_{dif}(x_2) > \tau_{dif}(x_1)$, where $\tau_{dif}(x_j) = L_{dif}^2(x_j)/D_e$ is the diffusion time over the average diffusion migration length $L_{dif}(x_j)$ from point of origin $x_j$ to the PN-junction edge, with $D_e$ the electron diffusion coefficient. Taking the penetration depth as a point of reference, the long-wavelength generated electron current travels on average a longer distance and its ac component accrues a larger RF phase-shift $\Omega\tau_{dif}(x_2)$ as compared to the phase-shift of short-wavelength-generated current $\Omega\tau_{dif}(x_1)$.

FIG. 8 describes the fundamental source of OED in a PN-type photodiode, illuminated with sinusoidal-modulated light at frequency $\Omega=2\pi f$. It stems from the wavelength-dependent migration time of the charge carriers, leading to a wavelength-dependent modulation-phase-shift of the ac current. Using the phase-shift method [9], the modulation phase-shift $\Delta\theta = \Omega\Delta\tau$ is monitored, where $\Delta\tau = \hat{D}\Delta\lambda$ due to chromatic dispersion D. In fiber-optics, it is customary to express $\hat{D} = DL$ where D is the dispersion parameter and L is the fiber length. In OED, we lump this into a dispersion parameter $\hat{D}_{OED}$, so that the modulation-phase-shift dependence on wavelength is $d\theta/d\lambda = 2\pi f \hat{D}o_{OED}$. The OED sensitivity is defined as $S_{OED} \equiv d\theta/d\lambda$, and is investigated herein as use as a performance parameter.

The model of OED dispersion and sensitivity of this Example is based on models of light-induced charge formation and migration [3-6]. The salient features of OED for three PN-type photodiodes are: 1) an entrance-region-dominated device, 2) a substrate-region-dominated device and 3) a dual-region device.

The main dimensionless OED parameter is $P \equiv \alpha W$, where $\alpha$ is the $\lambda$-dependent absorption coefficient and W is the width. Entrance-region, substrate-region and dual-region parameters are denoted with subscripts E, S and dual respectively. For a device having entrance and substrate widths $W_E$ and $W_S$ respectively (the thin intrinsic region of the photodiode is neglected), the parameter q is defined as $q \equiv P_E/(P_E+P_S) = \alpha W_E/\alpha(W_E+W_S) = W_E/(W_E+W_S)$. The device is referred to as entrance-dominated ($P_S \ll P_E$) for $q \to 1$ and substrate-dominated ($P_S \gg P_E$) for $q \to 0$. For $0 < q < 1$, the device output is a superposition of the current from each of the two regions. With light modulation $I_{in} = I_0(1 + me^{j\Omega t})$, the photodiode output ac signal is of the form $|F_i|e^{j(\Omega t + \theta_i)}$, where $|F_i|$ and $\theta_i$ are the modulation amplitude and phase responses for the three possibilities i=E, S or dual. The following equations describe the OED sensitivity for the entrance-dominated, substrate-dominated and dual-region devices respectively:

$$S_{OED,E} \equiv \frac{d\theta_E}{d\lambda} = \left[P_E \frac{d\theta_E}{dP_E}\right]\left[\frac{1}{\alpha}\frac{d\alpha}{d\lambda}\right]$$

$$S_{OED,S} \equiv \frac{d\theta_S}{d\lambda} = \left[P_S \frac{d\theta_S}{dP_S}\right]\left[\frac{1}{\alpha}\frac{d\alpha}{d\lambda}\right]$$

$$S_{OED,dual} \equiv \frac{d\theta_{dual}}{d\lambda} = \left[P_{tot} \frac{d\theta_{dual}}{dP_{tot}}\right]\left[\frac{1}{\alpha}\frac{d\alpha}{d\lambda}\right]$$

where $P_{tot} = P_E + P_S$. These expressions describe the OED sensitivity as a product of two terms. All of the design parameters are lumped into the first term $P(d\theta/dP)$, while the second term, $\alpha^{-1}(d\alpha/d\lambda)$, is dependent solely upon the absorption spectrum.

Figure 9:
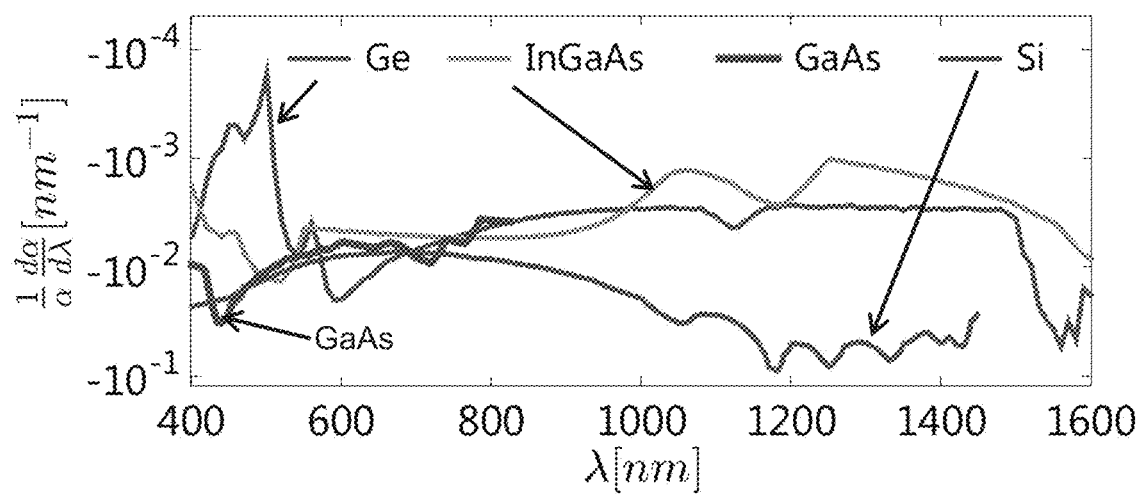
FIG. 9 shows $\alpha^{-1}(d\alpha/d\lambda)$ vs. $\lambda$ for various semiconductors. For these four materials, Ge and Si stand out as possessing the strongest (negative) values, in the c-band region and in the 1000-1400 nm region respectively. In addition, Si possesses a wideband sensitivity in the near IR, and Ge is dominant in the 550-700 nm region.

FIG. 9 plots $\alpha^{-1}(d\alpha/d\lambda)$ vs. $\lambda$ for some common materials, showing prominent peak (negative) values in the respective band-edge regions of the semiconductors [10]. Propitiously, for germanium, the peak is in the middle of the c-band. In addition, silicon stands out as possessing broadband OED sensitivity in the near IR due to a significantly lower absorption coefficient than other common semiconductors.

The first term, $P(d\theta/dP)$, will now be evaluated. Since $\Delta\theta = \Omega\Delta\tau$, embedded within $P(d\theta/dP)$ is a dependence on $\Omega$, in addition to P. A second dimensionless modulation parameter is defined as $M_i = \Omega W_i^2/D_i$ where $D_i$ is the diffusion coefficient of region i, equal to the modulation phase-shift accrued by diffusion current that traverses the complete width $W_i$ of region i. The procedure for designing the desired OED device optionally and preferably accounts for the effects of P and M on the modulation amplitude $|F_i|$ and on $P(d\theta/dP)$.

Figure 10A:
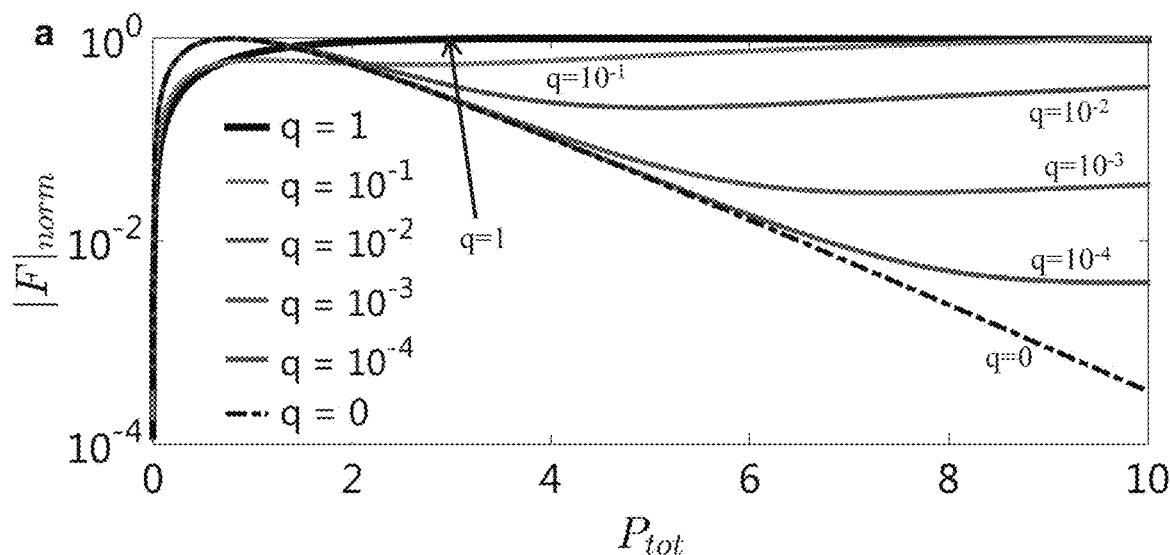
FIGS. 10A and 10B show modulation amplitude and optoelectronic chromatic dispersion (OED) sensitivity vs. $P_{tot}$ for single-region and dual-region devices; q=1: single-entrance-region, $P_{tot}=P_E$; q=0: single-substrate-region, $P_{tot}=P_S$; intermediate values of q: dual-region device, $P_{tot}=P_E+P_S$.
Figure 10B:
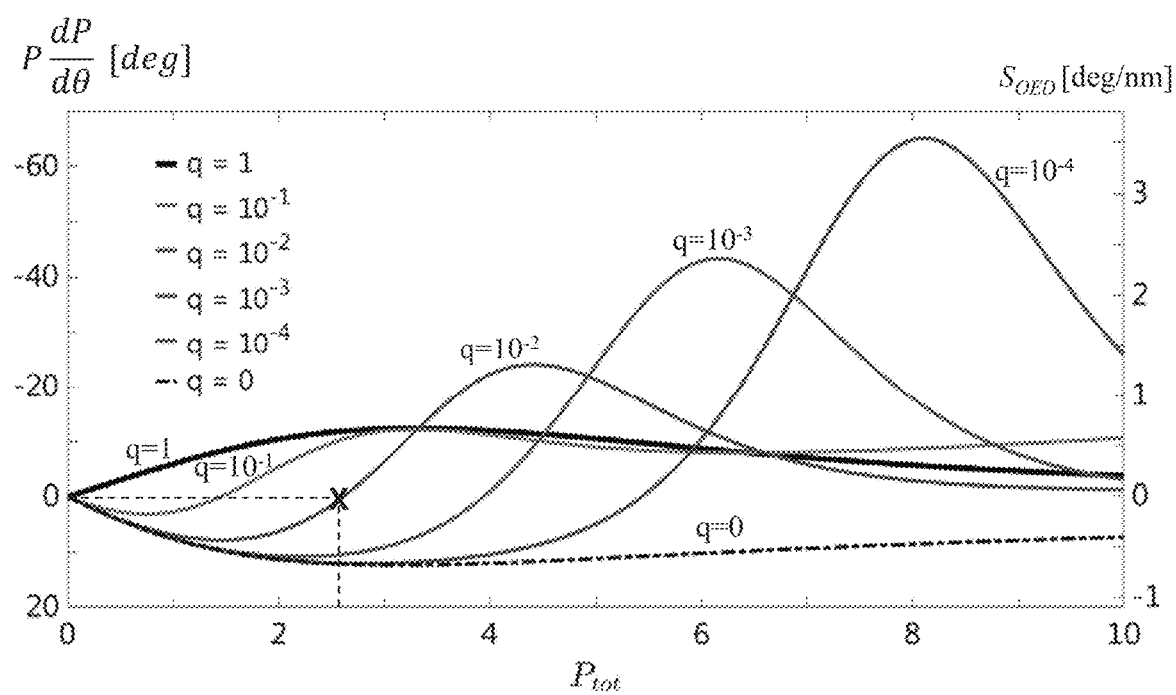

FIGS. 10A and 10B display graphs of the ac amplitude and OED sensitivity respectively, vs. $P_{tot}$, for devices that are either single-region entrance-dominated (q=1 and $P_{tot} = P_E$), single-region substrate-dominated (q=0, and $P_{tot} = P_S$) or dual-region (0<q<1, $P_{tot} = P_E + P_S$). The main features of the two single-region devices will now be summarized. From FIG. 10B, it is determined that for both single-region devices, the peak magnitude values for $P(d\theta/dP)$(plotted on the left y-axis—note the inverted values) are nearly equal at about 12.34 deg but opposite in sign, at points $P_{E,opt} \approx 3.3$, and $P_{S,opt} \approx 3.1$, respectively. The model predicts that these values are reached at optimum modulation parameters $M_{E,opt} \approx 3.3$, and $M_{S,opt} \approx 6.5$, respectively (see methods section, below), which is also the point where the amplitude is at a cut-off of $1/\sqrt{2}$ below maximum. For either device, increasing M beyond these values leads to a further decrease in amplitude, however in the entrance-dominated device $|P(d\theta/dP)|$ continues to increase, while for the substrate-dominated device $|P(d\theta/dP)|$ decreases as well.

The above analysis is applied to the germanium at $\lambda = 1560$ nm with peak $\alpha^{-1}(d\alpha/d\lambda)_{Ge,1560\ nm} = -0.054$ nm$^{-1}$. The $S_{OED,Ge,1560nm}$ values are plotted in FIG. 10B, right y-axis. A maximum $S_{OED}$ of $$|S_{OED,Ge}|_{max} = |P(d\theta/dP)\alpha^{-1}(d\alpha/d\lambda)|_{max} = |(12.34\text{deg})(-0.054\ nm^{-1})| \approx 0.67\ \text{deg}/nm$$

for both entrance and substrate-dominated devices is predicted (with opposite sign). Assuming a substrate-dominant device (a typical case for commercial PN photodiodes), leads to $W_s = P_{S,opt}/\alpha(1560\ nm) = 3.1/1280\ cm^{-1} = 24\ \mu m$. Note that the tolerance around these optimum values is quite wide, so that the actual width can be between 16-48 μm without paying a severe penalty in OED sensitivity.

As another example, silicon at $\lambda = 900$ nm possesses $\alpha_{Si}(900\ nm) \approx 306\ cm^{-1}$ and $\alpha^{-1}(d\alpha/d\lambda)_{Si,900\ nm} = -0.011$ nm$^{-1}$ so that an optimally designed substrate-dominated device can have $W_s = 3.1/(306\ cm^{-1}) \approx 101$ μm, with $S_{OED,S} \approx -0.14$ deg/nm. With $D_S \approx 10\ cm^2/s$ for silicon, the optimum frequency $f = M_S D_S/(2\pi W_S^2) \approx 104$ kHz. If the geometry is flipped to form an optimal entrance-dominated device with $W_E \approx 108$ μm, the sensitivity can be similar but with opposite sign, and this can be achieved at a lower modulation of 45 kHz. These predictions point to silicon-based photovoltaic cells as an inexpensive and sensitive device for OED.

One preferred feature is the $S_{OED}$ sign-flip for entrance and substrate single-region devices, and is straightforward to understand with the aid of FIG. 8. For common semiconductors in the UV-IR region, $d\alpha/d\lambda < 0$. Therefore, for increasing wavelength, the penetration depth inches closer to the PN junction in the entrance region, resulting in a decrease in the average RF phase delay. The opposite occurs in the substrate region: for increasing wavelength, the light penetrates further from the PN junction, and the RF phase delay increases.

Turning to the amplitude response, FIG. 10A displays significantly different behavior for the two single-region devices. For the entrance-region device, the amplitude response at $P_{E,opt} = 3.3$ is near its maximum achievable value. On the other hand, for the substrate-region device, the amplitude at $P_{S,opt} = 3.1$ is down to 23% of its maximum value (at $P_S = 0.75$).

Thus, when comparing the two single-region-device choices, the entrance-region device is advantageous for designing a high $S_{OED}$ application: 1) both $S_{OED}$ and ac amplitude are maximized at a common value $P_{E,opt} = 3.3$; 2) the required modulation frequency to reach maximum sensitivity is half of the frequency required for the substrate-dominated device, and 3) the option exists to increase the sensitivity further by increasing the modulation (albeit at the price of reduced amplitude).

Turning to the dual-region device, FIG. 10B displays features that emerge due to the interference between the modulating signals originating from the two regions. As q decreases from unity, the device begins to show characteristics of both regions, with negative and positive $S_{OED}$ at low and high $P_{tot}$ values respectively, and leading to zero-OED at the q-dependent $P_{w,ZD}(q)$ cross-over point where $P(d\theta/dP) = 0$. This leads to the following two equations which govern the design of the zero-dispersion-device at a desired zero-dispersion wavelength $\lambda_{ZD}$ and chosen q:

$$W_S = P_{tot,ZD}(q)[1-q]/\alpha(\lambda_{ZD})$$

$$W_E = [q/(1-q)] \cdot W_S$$

For example, assume a Ge photodiode designed for zero OED at desired $\lambda_{ZD}=1560$ nm where $\alpha(1560\text{ nm})=1280$ cm$^{-1}$, and a chosen design value q=0.01, e.g., $W_E=[q/(1-q)]W_S\approx 0.01\ W_S$. FIG. 10B shows that in this case the OED is zero at $P_{tot,ZD}\equiv\alpha(\lambda_{ZD})\cdot(W_E+W_S)=2.61$, so that the preferred design in this case is $W_E=0.2$ μm and $W_S=10.1$ μm.

The graph also demonstrates the possibility to surpass single-region sensitivity in the P region beyond $P_{opt}\approx 3$. As shown in FIG. 10A, this comes at the expense of lower signal amplitudes.

Figure 11:
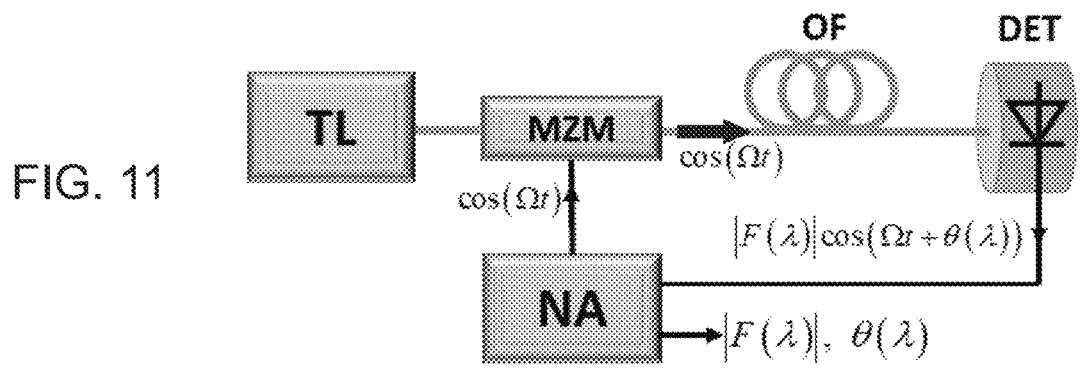
FIG. 11 is a schematic illustration of an experimental set-up to measure OED using the modulation-phase-shift technique. Wavelength-tunable light in the c-band is sinusoidal modulated by a network-analyzer-controlled Mach-Zehnder modulator and is then directed to a photodiode after traversing an optical fiber. The photodiode output is fed back to the network analyzer, which monitors the modulation amplitude $|F(\lambda)|$ and phase-shift $\theta(\lambda)$. The ac component of the optical intensity signal (large block arrow) and electronic signals (smaller arrows) are shown. TL—tunable laser; MZM—modulator; OF—optical fiber, either a short jumper or a DCF module; DET—detector under test (Ge PN or InGaAs PIN), NA: network analyzer.

The OED was measured in commercial photodiodes with the set-up of FIG. 11. Three experiments were carried out, where in each experiment the phase-shift of the ac signal was monitored as the wavelength was varied in the c-band between 1530-1560 nm. In the first experiment, the optical fiber was a short SMF-28 fiber jumper, and the detector was a PIN-type InGaAs detector (Tektronix P6703B). In the second experiment, the fiber was replaced with a dispersion compensating fiber module (Photonex EWBDK:680) with dispersion DL=−680 ps/nm, and the detector was the same InGaAs photodiode. In the third experiment, the short fiber jumper was used, and the detector was replaced with a germanium PN-type photodiode (PDA50B Thorlabs).

Figure 12A:
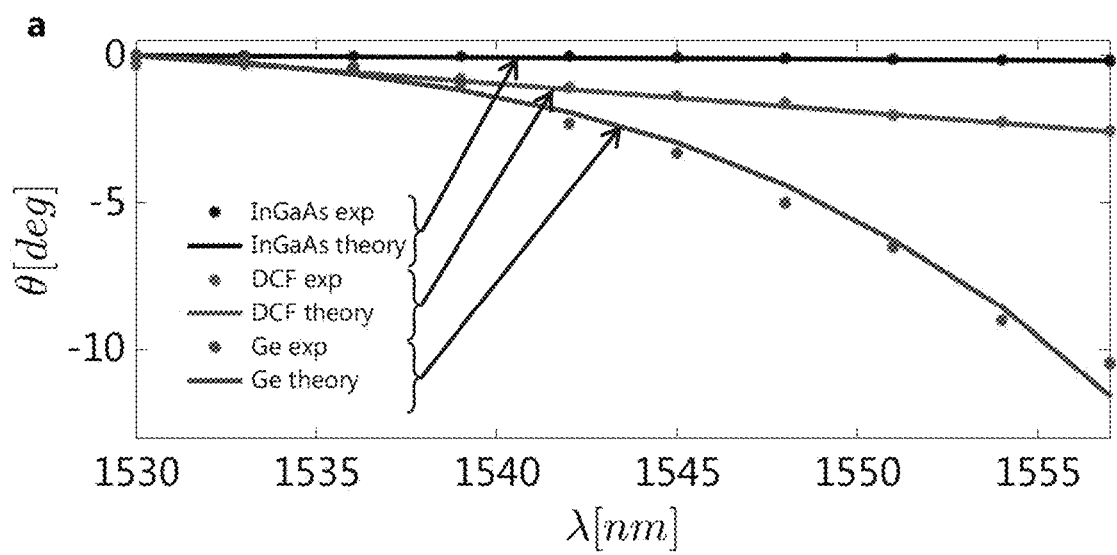
FIGS. 12A and 12B show experimental results and comparison to theory.

FIG. 12A shows the experimental results and theoretical predictions. Germanium displays a high OED, with a slope $S_{OED}\approx-0.53$ deg/nm within the c-band, in good agreement with theory assuming nominal values $W_E=10$ μm and $W_S=100$ μm. Using 400 kHz modulation, the measured OED dispersion coefficient $\widetilde{D_{OED}}=S_{OED}/2\pi f\approx-3.6\cdot 10^3$ ps/nm, equivalent (with opposite sign) to the dispersion in approx. 210 km of standard (SMF28) optical fiber, and is over a factor of 5 larger than the dispersion of the DCF fiber (blue line and dots). On the other hand, the InGaAs PIN-type photodiode has a small OED in this region, as predicted.

The 3-sigma phase noise that accompanied the signal was also measured. With an electronic bandwidth B=500 Hz, the noise was $5\times 10_{-3}$ deg for all the experiments, and was proportional to $B^{1/2}$. Therefore, with the measured $S_{OED}\approx-0.53$ deg/nm, the spectral resolution (at SNR=1) for wavelength-monitoring was 10 pm.

Figure 12B:
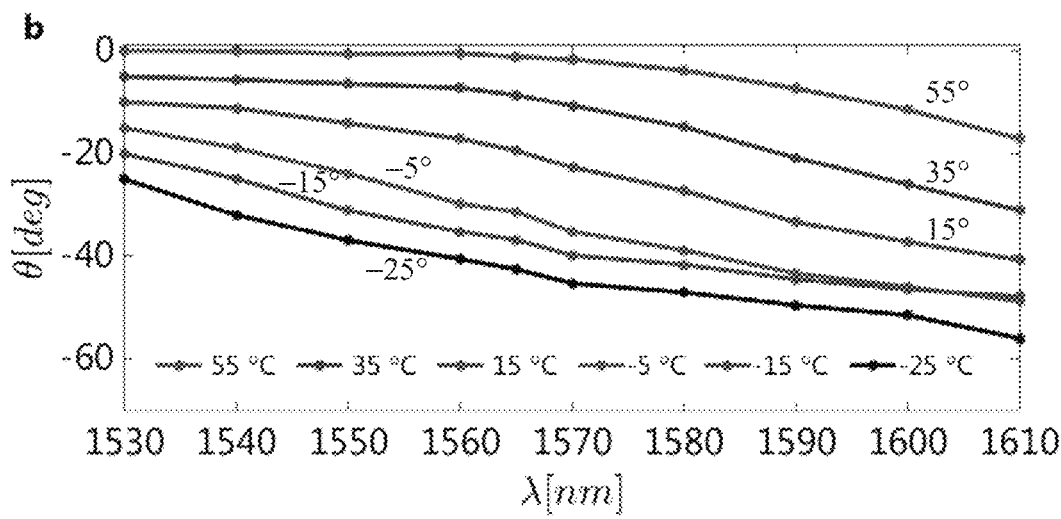

In a further experiment, temperature-tuning of the OED in the Ge photodiode was demonstrated, as shown in FIG. 12B. The high OED region, which follows the absorption-edge region, shifts to higher wavelengths with increasing temperature. The amount of the measured shift $\Delta\lambda/\Delta T$, on the order of 1 nm/° C., agrees with published data for germanium [11-13]. Other OED-tuning mechanisms, e.g. strain or bias voltage tuning are also contemplated according to some embodiments of the present invention.

Chromatic dispersion can be used according to various exemplary embodiments of the present invention for optical sensing. By viewing the optoelectronic process in a PN photodiode as a tunable source of chromatic dispersion, the RF photonics of the present embodiments can be used for many applications, such as, but not limited to, spectroscopy, environmental sensing, and investigating the physics of the optoelectronic process.

Methods

Development of the Model for OED Sensitivity

The description below is based on the continuity equation for light-induced charge carrier generation and migration by diffusion PN and PIN-type photodiodes [3,4,5,6]. Aiming at OED of a PN photodiode, the drift current in the description below is neglected compared to the diffusion current that is generated in the entrance and substrate regions. The equations for $S_{OED}$ have been developed by the present Inventors for three types of PN photodiodes: 1) an entrance-region-dominated device, 2) a substrate-region-dominated device and 3) a dual-region device. The parameters in each of these three devices are denoted herein with the subscript E, S, and dual, respectively. Simulations described below were conducted using the MATLAB® software.

1 Single-Region OED: Entrance Region

The Sawyer-Rediker model describes the dc and ac current that forms in the entrance region of a PN photodiode under modulated illumination power of the form $I_{in}=I_0(1+me^{i\Omega t})$ where m is the modulation index. The ac current density component $j_{ac,E}$ is a solution of the diffusion equation for the entrance-region carrier density $p_E(x,t)$ with the specified boundary conditions: $dp_E/dx=0$ at the entrance $x=0$ (assuming negligible surface recombination) and $p_E(W_E)=0$ at the PN-junction interface $x=W_E$ [3]. The present embodiments contemplate both p-type and n-type For doping. The diffusion equation is formulated herein using three dimensionless parameters, as follows. A first parameter is a penetration parameter $P_E\equiv\alpha W_E$ is the ratio of the entrance width $W_E$ to the wavelength-dependent penetration depth $\alpha^{-1}$. A first parameter is a modulation parameter defined as $M_E\equiv\Omega W_E^2/D_E$, where $D_E$ is the diffusion coefficient of the minority carrier. $M_E$ represents the modulation phase accrued by a modulated migrating carrier density wave that traverses the entire width $W_E$ (note that $W_E^2/D_E$ is the average diffusion time to traverse the entire entrance region). A third parameter is $\hat{W}_E=W_E/L_E$, where $L_E=(D_E\tau_{dif,E})^{1/2}$ is the characteristic diffusion length and $\tau_{dif,E}$ the diffusion time of the entrance-region carriers before recombination occurs. With these substitutions, and assuming negligible surface recombination, the ac current is $$j_{ac,E}=qmI_0 e^{i\Omega t}F_E(P_E,M_E,\hat{W}_r) \qquad \text{(EQ. 5.1a)}$$

Where $$F_E(P_E,M_E,\hat{W}_r)=\left[\frac{P_E^2}{P_E^2-\hat{W}_r^2-iM_E}\right]\left[\frac{1-e^{-P_E}(\cosh(u_E)+(u_E/P_E)\sinh(u_E))}{\cosh(u_E)}\right] \qquad \text{(EQ. 5.1b)}$$

q is the electronic charge and $u_E\equiv\sqrt{\hat{W}_E+iM_E}$. $F_E(P_E, M_E, \hat{W}_E)=|F_E|\exp(i\theta_E)$ describe the ac amplitude $|F_E|$ and phase $\theta_E$ response of the entrance region. They are dependent upon optical wavelength (through the absorption coefficient in $P_E$), modulation frequency (through $M_E$), and the other material parameters: $W_E$, $D_E$ and $L_E$. With a focus on the OED sensitivity, and realizing that the wavelength dependence is only through $P_E$, we can express the entrance-region OED sensitivity as follows:

$$S_{OED,E}=\frac{d\theta_E}{d\lambda}=\frac{d\theta_E}{dP_E}\frac{dP_E}{d\alpha}\frac{d\alpha}{d\lambda}=\left[P_E\frac{d\theta_E}{dP_E}\right]\left[\frac{1}{\alpha}\frac{d\alpha}{d\lambda}\right] \qquad \text{(EQ. 5.2)}$$

noting that $dP_E/d\alpha=W_E=P_E/\alpha$. This expression describes the sensitivity as a product of two terms. All of the design parameters $P_E$, $M_E$, and $\hat{W}_E$, are lumped into the first term $P_E(d\theta_E/dP_E)$, while the second term, $\alpha^{-1}(d\alpha/d\lambda)$, is solely dependent upon the absorption spectrum. Therefore, an unambiguous and simple technique emerges for designing the photodiode's structure and operating parameters to achieve maximum sensitivity, regardless of the wavelength.

For any operating wavelength, $S_{OED,E}$ is maximized by maximizing $P_E(d\theta_E/dP_E)$. This term is dependent upon $P_E$ as well as $M_E$. Recalling that the $M_E$ parameter is proportional to the modulation frequency, there will be a cut-off value $M_{E,co}$ after which the amplitude response $|F_E|$ falls below a cut-off level, usually taken to be a factor of $1/\sqrt{2}$. The model predicts the following optimum pair of values ($P_{E,opt}=3.1$, $M_{E,opt}=3.3$), and that $M_{E,opt}=M_{E,opt}$ for the entrance-dominated device. Increasing $M_E$ beyond $M_{E,co}$ will lead to a further increase in $P_E(d\theta_E/dP_E)$, i.e. the sensitivity continues to increase, albeit at the expense of a further decrease in amplitude. Regarding the $\hat{W}_E$ parameter, we assumed $\hat{W}_E=1$ in our simulations, i.e. the device length is equal to the characteristic diffusion length of the semiconductor. The simulations show that as long as $\hat{W}_E \leq 1$, i.e. there is negligible recombination over the device width, the results are not sensitively dependent upon $\hat{W}_E$.

2 Single-Region OED: Substrate Region

The photocurrent in the substrate-region is due to carrier density $p_S(x,t)$ that forms in the region $W_E+d<x<W_S$. Following the same approach as for the entrance region, with the boundary conditions $dp_S/dx=0$ at $x=W_S$ (negligible surface recombination) and $p_S(x=W_E+d)=0$ at the PN junction, the substrate ac current density is $$j_{ac,S} = qmI_0 e^{i\Omega t} F_S(P_S, M_S, \hat{w}_s) \quad (EQ. 5.3a)$$

where $$F_S(P_S, M_S, \hat{w}_s) = \left[\frac{P_S \exp(-P_S)}{P_S^2 - \hat{w}_s^2 - iM_S}\right]\left[\frac{u_S \exp(-u_S) - P_S \exp(-P_S)}{\cosh(u_S)} - u_S + P_S\right] \quad (EQ. 5.3b)$$

and where a negligibly thin entrance region and depletion region were assumed so that only the substrate current is significant: $W_E+d \approx 0$. In. EQs. 5.3a and 5.3b, $P_S = \alpha W_S$, $M_S = \Omega W_S^2/D_S$, $\hat{W}_S = W_S/L_S$, $L_S = (D_S \tau_{dif,S})^{1/2}$ with $D_S$ the substrate-region diffusion coefficient, $\tau_{dif,S}$ is the diffusion time, and $u_S \equiv \sqrt{\hat{W}_S + iM_S}$. $F_S(P_S, M_S, \hat{W}_S) = |F_S|\exp(i\theta_S)$ describes the ac amplitude and phase response of the substrate region. This leads to the substrate OED sensitivity:

$$S_{OED,S} = \frac{d\theta_S}{d\lambda} = \frac{d\theta_S}{dP_S}\frac{dP_S}{d\alpha}\frac{d\alpha}{d\lambda} = \left[P_S \frac{d\theta_S}{dP_S}\right]\left[\frac{1}{\alpha}\frac{d\alpha}{d\lambda}\right] \quad (EQ. 5.4)$$

Following the same logic as for the entrance region, the simulations show that the optimum design to maximize $S_{OED,S}$ for the substrate-dominant device is ($P_{S,opt}=3.1$, $M_{S,opt}=6.5$) and $M_{S,opt}=M_{S,co}$. However, unlike the entrance-dominated case, a further increase in M beyond $M_{S,co}$ leads to a decrease in the sensitivity term $P_S(d\theta_S/dP_S)$ together with the decrease in amplitude $|F_S|$.

3 Dual-Region OED

A dual-region device is one in which the contributions of each region to the overall current and sensitivity are not negligible. This depends upon the operating wavelength and the widths of the regions. The OED sensitivity in this case can be expressed Based on the above model, since the ac current $j_{ac,dual}$ in this dual-region device is the sum of the contributions from the two regions. The reduced light power that reaches the input to the substrate region as a result of absorption $e^{-P_E}$ that took place in the entrance region (absorption in the thin intrinsic region is neglected) is also accounted for in this case. Based on the above equations, $$j_{ac,dual} = j_{ac,E} + e^{-P_E} j_{ac,S} = qmI_0 e^{i\Omega t} F_{dual} \quad (EQ. 5.7)$$

where $F_{dual} = F_E e^{i\theta_E} + e^{-P_E} F_S e^{i\theta_S} = |F_{dual}(P_E, P_S, M)| e^{i(\theta_{dual}(P_E, P_S, M))}$ describes the total ac amplitude and phase-shift. This leads to the dual-region OED sensitivity:

$$S_{OED,dual} = \frac{d\theta_{dual}}{d\lambda} = \frac{d\theta_{dual}}{dP_{tot}}\frac{dP_{tot}}{d\alpha}\frac{d\alpha}{d\lambda} = \left[P_{tot}\frac{d\theta_{dual}}{dP_{tot}}\right]\left[\frac{1}{\alpha}\frac{d\alpha}{d\lambda}\right] \quad (EQ. 5.8)$$

where $P_{tot} \equiv P_E + P_S$. As in the two previous cases, the first term determines the optimum design criteria, and the second absorption-dependent term is common to all three cases.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

REFERENCES

[1] Fox, M. Optical Properties of Solids (Oxford Univ. Press, 2nd Ed., 2010)
[2] Agrawal G. P., Fiber-Optic Communication Systems (John Wiley & Sons, 4th Ed., 2010).
[3] Sawyer D. E. and Rediker R. H., Narrow Base Germanium Photodiodes. Proc. of the IRE, 46, 1122-1130 (1958)
[4] Lucovsky, G., Lasser, M. E. and Emmons, R. B., Coherent Light Detection in Solid-State Photodiodes. Proc. IEEE. 51, 166-172 (1963)
[5] Lucovsky, G. Schwarz, R. F. and Emmons, R. B., Transit-Time Considerations in p-i-n Diodes, J. Appl. Phys.35:3, 622-628 (1964)
[6] Bowers, J. and Y. Wey, High-speed photodetectors, in Handbook of Optics, Volume I: fundamentals, techniques, and design, M. Bass, ed. (McGraw-Hill, 2nd Ed. 1995).
[7] Jang, J. H., Cueva, G., Sankaralingam, R., Fay, P., Hoke, W. E., & Adesida, I., Wavelength dependent characteristics of high-speed metamorphic photodiodes. IEEE Photonics Technology Letters, 15(2), 281-283 (2003)
[8] Goushcha, A. O., Tabbert, B., On response time of semiconductor photodiodes, Opt. Eng. 56, 097101 (2017)
[9] Dennis, T. and Williams, P., Achieving high absolute accuracy for Group-delay measurements using the Modulation phase-shift technique, J. Light. Tech. 23, 3748-3754 (2005)
[10] Absorption coefficient data for the various semiconductors were taken from public-domain databases such as refractiveindex(dot)info/ and www(dot)pveducation(dot) org/pvcdrom/materials/optical-properties-of-silicon

[11] Dash, W. C., and Newman R., Intrinsic optical absorption in single-crystal germanium and silicon at 77 K and 300 K. Phys. Rev. 99.4, 1151 (1955)

[12] Balbi, M., Sorianello, V., Colace, L., and Assanto, G. Analysis of temperature dependence of Ge-on-Si p-i-n photodetectors, Physica E 41(6), 1086-1089 (2009)

[13] Harris T. R., Optical properties of Si, Ge, GaAs, GaSb, InAs, and InP at elevated temperatures, Thesis, Air Force Institute of Technology (2010)

[14] Yi, X., Chew, S. X., Song, S., Li, L., Tian, X., Nguyen, L., and Minasian, R., Integrated Microwave Photonics for Sensing and Signal Processing. In Optoelectronic Devices and Integration (pp. OW3C-2). Optical Society of America (2019)

[15] K. Yuksel, M. Wuilpart, V. Moeyaert and P. Megret, "Optical frequency domain reflectometry: A review," in Proc. 11th Int. Conf. Transparent Opt. Netw. (ICTON '09), 1 723-727 (2009).

[16] J Hervás, J., Feenández-Pousa, C. R., Barrera, D., Pastor, D., Sales, S., & Capmany, J., An interrogation technique of FBG cascade sensors using wavelength to radio-frequency delay mapping, J. Lightwave Tech., 33(11), 2222-2227 (2015)

[17] Ziv Glasser, Gidon Zaychik, Rita Abramov, Daniel Gotliv, and Shmuel Stemklar, "Phaseless incoherent optical frequency domain spectroscopy," Opt. Lett. 42, 1848-1851 (2017)

[18] Bellido, J. C., & Fernindez-Pousa, C. R., Spectral analysis using a dispersive microwave photonics link based on a broadband chirped fiber Bragg grating. J. Light. Tech. 33(20), 4207-4214 (2015)

[19] Li, L., Yi, X., Song, S., Chew, S. X., Minasian, R., & Nguyen, L. Microwave photonic signal processing and sensing based on optical filtering, Applied Sciences, 9(1), 163 (2019)

[20] Zhao, J., Zhang, H., Yang, Z., Xu, J., Xu, T., & Wang, C., Few-Mode Fibers With Uniform Differential Mode Group Delay for Microwave Photonic Signal Processing, IEEE Access, 8, 135176-135183 (2020)

What is claimed is:

1. A system for providing information based on a spectral content of an optical signal, comprising:
   an optical modulator for applying a time-dependent modulation to the optical signal according to at least one sub-optical modulation frequency, to provide a modulated optical signal;
   an optoelectronic device configured for receiving said modulated optical signal and responsively producing, at a wavelength dependent photosensitive region within said optoelectronic device, pairs of charge carriers effecting a net electrical current within said optoelectronic device thereby generating an electrical sensing signal, wherein transit times of said charge carriers within said optoelectronic device are also wavelength dependent and wherein electrical signals generated by charge carriers in response to different spectral components of the optical signal exhibit different modulation parameters; and
   a signal processing system configured for processing said electrical sensing signal and to generate output correlative to at least one wavelength of the optical signal based on said modulation parameters.

2. The system of claim 1, wherein said optoelectronic device is unbiased.

3. The system according to claim 1, wherein said optoelectronic device is responsive to electrical bias, and wherein the system comprises an electrical drive circuit configured to apply an electrical bias signal to said optoelectronic device and to scan a DC level of said electrical bias signal.

4. The system according to claim 3, wherein said electrical bias signal is applied while maintaining a generally constant bandgap characterizing a photosensitive region of said optoelectronic device.

5. The system according to claim 3, wherein said electrical drive circuit is configured to scan a DC level of said electrical bias signal in addition to said modulation of said electrical bias signal.

6. The system of claim 1, wherein said optoelectronic device is responsive to electrical bias, wherein the system comprises an electrical drive circuit for applying to said optoelectronic device an electrical bias signal modulated according to a time-dependent modulation, and wherein said signal processing system is configured to generate output correlative to said at least one wavelength also based on said modulation of said electrical bias signal.

7. The system according to claim 1, comprising at least one additional optoelectronic device, wherein said modulated optical signal is directed also towards said at least one additional optoelectronic device, and wherein said signal processing system is configured for processing electrical sensing signal generated by said at least one additional optoelectronic device and to generate said output also based on electrical sensing signal generated by said at least one additional optoelectronic device.

8. The system according to claim 1, wherein said signal processing system is configured for determining variations in said modulation frequency, and to generate said output also based on said variations.

9. The system according to claim 1, comprising a beam splitting system for splitting said modulated optical signal into two modulated optical signals, and directing said two modulated optical signals to opposite sides of said optoelectronic device.

10. The system according to claim 1, comprising an additional optoelectronic device, and a beam splitting system for splitting said modulated optical signal into two modulated optical signals, and directing one of said two modulated optical signals to said optoelectronic device and another one of said two modulated optical signals to said additional optoelectronic device, so as to cancel optoelectronic chromatic dispersion among said two devices.

11. The system according to claim 1, comprising a reflector for reflecting said modulated optical signal to make a double pass within said optoelectronic device.

12. The system according to claim 1, comprising transmitting an probe signal to an optoelectronic device, and receiving a response signal from said optoelectronic device, wherein the optical signal is said response signal, and wherein said output comprises at least one characteristic of said optoelectronic device.

13. The system according to claim 1, wherein the optical signal is a spectral component of a polychromatic beam, and is spatially separated from other spectral components of said polychromatic beam.

14. The system according to claim 1, wherein said optical signal is polychromatic and the system or method is applied to generate output indicative of a spectrum of said optical signal.

15. The system according to claim 1, wherein said optical signal is monochromatic and the system or method is applied to monitor an absolute value of said wavelength, and/or a spectral shift in said wavelength.

16. The system according to claim 1, in use for spectroscopy, sensing signals transmitted through optical fibers, or radiofrequency-photonic signal processing.

17. A method of providing information based on a spectral content of an optical signal, comprising:
applying a time-dependent modulation to the optical signal according to at least one sub-optical modulation frequency, to provide a modulated optical signal;
receiving said modulated optical signal by an optoelectronic device configured for receiving said modulated optical signal and responsively producing, at a wavelength dependent photosensitive region within said optoelectronic device, pairs of charge carriers effecting a net electrical current within said optoelectronic device, thereby generating an electrical sensing signal, wherein transit times of said charge carriers within said optoelectronic device are also wavelength dependent and wherein electrical signals generated by charge carriers in response to different spectral components of the optical signal exhibit different modulation parameters; and
processing said electrical sensing signal to generate output correlative to at least one wavelength of the optical signal based on said modulation parameters.

18. The method according to claim 17, comprising receiving said optical signal also by at least one additional optoelectronic device, processing electrical sensing signal generated by said at least one additional optoelectronic device, wherein said generating said output is also based on said electrical sensing signal generated by said at least one additional optoelectronic device.

19. The method according to claim 17, comprising splitting said modulated optical signal into two modulated optical signals, and directing said two modulated optical signals to opposite sides of said optoelectronic device.

20. The method according to claim 17, comprising splitting said modulated optical signal into two modulated optical signals, and directing one of said two modulated optical signals to said optoelectronic device and another one of said two modulated optical signals to an additional optoelectronic device, so as to cancel optoelectronic chromatic dispersion among said two devices.

21. The method according to claim 17, comprising reflecting said modulated optical signal to make a double pass within said optoelectronic device.

22. The method according to claim 17, comprising applying a strain or a temperature change to said optoelectronic device so as to vary optoelectronic chromatic dispersion effected by said optoelectronic device.

23. The method according to claim 22, wherein said varying comprises reducing said optoelectronic chromatic dispersion to below a predetermined threshold.

* * * * *